US012367366B2

(12) United States Patent
Hill et al.

(10) Patent No.: US 12,367,366 B2
(45) Date of Patent: *Jul. 22, 2025

(54) ARTICLE-IDENTIFICATION-AND-LOCATION DEVICE SYSTEMS AND METHODS OF USING SAME

(71) Applicant: Position Imaging, Inc., Portsmouth, NH (US)

(72) Inventors: Edward L. Hill, Conway, NH (US); John Liu, Madbury, NH (US); Narasimhachary Nallana Chakravarty, Rollinsford, NH (US); Brian Martel, Boulder, CO (US); Marc Bujold, Stratham, NH (US); Brett Bilbrey, Sunnyvale, CA (US); Mark R. Ibbotson, Bentonville, AR (US)

(73) Assignee: Position Imaging, Inc., Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,206

(22) Filed: Mar. 4, 2024

(65) Prior Publication Data
US 2024/0202482 A1  Jun. 20, 2024

Related U.S. Application Data

(63) Continuation of application No. 17/398,038, filed on Aug. 10, 2021, now Pat. No. 11,922,246, which is a
(Continued)

(51) Int. Cl.
G08B 13/14 (2006.01)
G06K 7/10 (2006.01)
(Continued)

(52) U.S. Cl.
CPC ..... *G06K 19/0723* (2013.01); *G06K 7/10099* (2013.01); *G06K 19/07749* (2013.01)

(58) Field of Classification Search
CPC ........... G06K 19/0723; G06K 7/10099; G06K 19/07749; G06K 19/04; G06K 19/07705;
(Continued)

(56) References Cited

U.S. PATENT DOCUMENTS 6,712,278 B2  3/2004  Livingston et al.
6,989,741 B2  1/2006  Kenny et al.
(Continued)

FOREIGN PATENT DOCUMENTS

JP  2010023952 A  2/2010
JP  2011054132 A  3/2011
(Continued)

OTHER PUBLICATIONS

International Search Report and Written Opinion in PCT/US22/39768 mailed on Nov. 1, 2022.
(Continued)

Primary Examiner — Anh V La
(74) Attorney, Agent, or Firm — Schmeiser, Olsen & Watts LLP

(57) ABSTRACT

A luggage tag comprises an indicator; a thin tag body including a radiofrequency (RF) receiver configured to receive an RF signal transmitted by an RF transmitter and a processor in communication with the RF receiver and the indicator, the processor being configured to acquire information from the RF signal that is received by the RF receiver and to turn on the indicator in response to the information acquired from the RF signal; and means for coupling the thin tag body of the luggage tag to luggage.

16 Claims, 25 Drawing Sheets

Related U.S. Application Data continuation-in-part of application No. 16/891,729, filed on Jun. 3, 2020, now Pat. No. 11,107,337.

(60) Provisional application No. 62/857,059, filed on Jun. 4, 2019.

(51) Int. Cl.
  *G06K 19/07* (2006.01)
  *G06K 19/077* (2006.01)

(58) Field of Classification Search
  CPC ......... G06K 19/07758; G06K 19/0717; G06Q 10/0836
  USPC .......... 235/380; 340/539.21, 539.23, 539.13, 340/571, 568.1
  See application file for complete search history.

(56) References Cited

U.S. PATENT DOCUMENTS

| | | | |
|---|---|---|---|
| 8,766,773 | B2 | 7/2014 | Kennedy et al. |
| 9,311,586 | B2 | 4/2016 | Robinette et al. |
| 9,922,531 | B1 | 3/2018 | Doxey et al. |
| 9,961,498 | B2 | 5/2018 | Evans et al. |
| 10,121,101 | B1 | 11/2018 | Warther |
| 10,158,976 | B2 | 12/2018 | de Barros Chapiewski et al. |
| 10,373,170 | B2 | 8/2019 | Baker et al. |
| 10,631,133 | B2 | 4/2020 | Mahmoud et al. |
| 11,107,337 | B2 | 8/2021 | Hill et al. |
| 11,922,246 | B2 * | 3/2024 | Hill .................... G06K 19/0717 |
| 2001/0052850 | A1 | 12/2001 | Zimmerman |
| 2003/0213840 | A1 | 11/2003 | Livingston et al. |
| 2005/0088302 | A1 | 4/2005 | Pucci et al. |
| 2005/0212672 | A1 | 9/2005 | Fry |
| 2005/0236479 | A1 | 10/2005 | Schmidtberg et al. |
| 2007/0002139 | A1 | 1/2007 | Benson et al. |
| 2008/0207357 | A1 | 8/2008 | Savarese et al. |
| 2009/0315704 | A1 | 12/2009 | Rosing et al. |
| 2010/0033323 | A1 | 2/2010 | Tsai et al. |
| 2011/0148625 | A1 | 6/2011 | Velusamy |
| 2011/0210847 | A1 | 9/2011 | Howard et al. |
| 2012/0098642 | A1 | 4/2012 | Krawczewicz et al. |
| 2012/0182146 | A1 | 7/2012 | Berglund et al. |
| 2012/0206237 | A1 | 8/2012 | Lovegreen |
| 2013/0033380 | A1 | 2/2013 | Fawcett et al. |
| 2013/0234853 | A1 * | 9/2013 | H. Kazerouni .... G06K 19/0716 340/572.1 |
| 2014/0283565 | A1 | 9/2014 | Edwards |
| 2014/0291405 | A1 | 10/2014 | Harkes |
| 2014/0292488 | A1 * | 10/2014 | Trohak .................... G01S 3/046 29/601 |
| 2015/0002274 | A1 * | 1/2015 | Sengstaken, Jr. ........ A61J 1/035 340/10.34 |
| 2015/0302349 | A1 | 10/2015 | Atkinson |
| 2015/0324733 | A1 | 11/2015 | Goodall et al. |
| 2016/0055451 | A1 | 2/2016 | Waters et al. |
| 2016/0063604 | A1 | 3/2016 | Shaffer et al. |
| 2016/0148440 | A1 | 5/2016 | Kwak |
| 2016/0183653 | A1 | 6/2016 | Warther |
| 2016/0379102 | A1 | 12/2016 | Ferguson |
| 2017/0249793 | A1 | 8/2017 | Drako et al. |
| 2018/0141211 | A1 | 5/2018 | Wellman et al. |
| 2019/0102735 | A1 | 4/2019 | Barton et al. |
| 2019/0160646 | A1 | 5/2019 | Hoossainy et al. |
| 2019/0197853 | A1 * | 6/2019 | Trivelpiece ........ G06K 19/0723 |
| 2019/0236424 | A1 * | 8/2019 | Atkinson .......... G06K 19/07707 |
| 2020/0143215 | A1 | 5/2020 | Friedenberg et al. |
| 2020/0393555 | A1 | 12/2020 | Kletsov et al. |
| 2021/0012635 | A1 | 1/2021 | Hill et al. |

FOREIGN PATENT DOCUMENTS

| | | |
|---|---|---|
| JP | 2013003937 A | 1/2013 |
| JP | 2016031539 A | 3/2016 |
| JP | 2017528828 A | 9/2017 |
| KR | 20090060613 A | 6/2009 |
| WO | 2015144210 A1 | 10/2015 |
| WO | 2012152745 A1 | 6/2016 |
| WO | 2018236759 A1 | 12/2018 |

OTHER PUBLICATIONS

International Search Report and Written Opinion in PCT/US2020/035897 mailed on Sep. 9, 2020.
Non-Final Office Action in U.S. Appl. No. 16/891,729 mailed on Jan. 1, 2021.
Notice of Allowance in U.S. Appl. No. 16/891,729 mailed on May 3, 2021.
Extended Search Report in European Patent Application No. 20818773.2 mailed on Jun. 6, 2023.
Non-Final Office Action in U.S. Appl. No. 17/588,993 mailed on Jun. 20, 2023.
International Preliminary Report on Patentabiliy in PCT/US2020/035897 mailed on Dec. 16, 2021.
Examination Report in NZ Patent Application No. 777428, mailed on Jun. 19, 2023.
Ex Parte Quayle Action in U.S. Appl. No. 17/588,993 mailed on Jan. 5, 2024.
Examination Report in NZ Patent Application No. 777428, mailed on Jan. 10, 2024.
Non-Final Office Aciton in U.S. Appl. No. 17/398,038 mailed on Jun. 7, 2024.
Notice of Allowance in U.S. Appl. No. 17/588,993 mailed on Feb. 21, 2024.
Office Action in Japanese Patent Application No. 2021-571812 mailed on Apr. 25, 2024.
Examination Report in Australian patent application No. 2020287606, mailed on Mar. 31, 2024.
Office Action in Japanese patent application No. 2021-571812 mailed on Jan. 22, 2025.
Office Action in Korean patent application No. 10-2021-7038472 mailed on Feb. 7, 2025.
Examination Report in Canadian Patent Application No. 3,138,350 mailed on May 12, 2025.

* cited by examiner

ARTICLE-IDENTIFICATION-AND-LOCATION DEVICE SYSTEMS AND METHODS OF USING SAME

CROSS-REFERENCE TO RELATED APPLICATION

This application is a continuation of U.S. Nonprovisional application Ser. No. 17/398,038 titled "Article Identification and Location Device and Systems and Methods of Using Same," filed Aug. 10, 2021, which is a continuation-in-part of U.S. Nonprovisional application Ser. No. 16/891,729, titled "Article Identification and Location Device and Systems and Methods of Using Same," filed Jun. 3, 2020, now U.S. Pat. No. 11,107,337, which claims priority to and the benefit of U.S. Provisional Application No. 62/857,059, titled "Article Identification Device," filed on Jun. 4, 2019, the entirety of each of which is incorporated by reference herein for all purposes.

FIELD OF THE INVENTION

The invention relates to systems, methods, and devices for helping store personnel and customers locate specific products set aside at a business or organization.

BACKGROUND

E-commerce continues to see significant year-over-year growth and is expected do so for the foreseeable future. Many online retailers ship purchased goods to a customer's front door. With the rise of "porch pirates", however, namely, people who steal packages from off customers' porches or front door areas, many customers want their online orders shipped to or held at a store, where the purchased goods can await their pickup. This process has the further advantage of saving money on shipping costs. Retailers are thus leveraging their brick-and-mortar stores to fulfill online sales, which increases customer foot traffic at their sites, wins more customers, and results in more volume.

Retailers, however, are generally not equipped to efficiently handle in-store pickups. Most buy-online-pickup-in store (BOPIS) solutions are expensive and require additional staff or significant changes in operation. A poorly designed pickup process can cause delay and frustrate customers. Once a customer has had a bad pickup experience, he or she is unlikely to try in-store pick-up again. Other self-pickup solutions, such as package lockers and package towers are expensive, restrictive, fixed, and take up space, and staffing a pickup counter takes staff away from the business of selling or other more productive business operations.

SUMMARY

All examples and features mentioned below can be combined in any technically possible way.

In one aspect, the invention is related to a luggage tag comprising: an indicator; a thin tag body including a radiofrequency (RF) receiver configured to receive an RF signal transmitted by an RF transmitter and a processor in communication with the RF receiver and the indicator, the processor being configured to acquire information from the RF signal that is received by the RF receiver and to turn on the indicator in response to the information acquired from the RF signal; and means for coupling the thin tag body of the luggage tag to luggage.

The means for coupling the thin tag body of the luggage tag to luggage can comprise a strap. The strap can be tamperproof. The tag body can further include at least one sensor adapted to detect a change of state of the body of the luggage tag or an environmental condition of the luggage tag. The at least one sensor can include at least one of an inertial sensor, a humidity sensor, a temperature sensor, a contact sensor, an angular Hall sensor, or a capacitive touch sensor. The tag body can further include a memory storing a unique identifier associated with the luggage tag and with user information about a user of the luggage tag. The processor can further be configured to compare the information acquired from the RF signal with the unique identifier stored in the memory and to turn on the indicator if the information acquired from the RF signals matches the unique identifier stored in the memory. The indicator can be a light-emitting diode (LED). The indicator can be a speaker.

In another aspect, the invention is related to a method of monitoring environmental conditions of an item of interest. The method comprises measuring, by an article-identification-and-location device physically coupled to the item of interest, a condition of an environment of the item of interest; receiving, by the article-identification-and-location device, information in a radiofrequency (RF) signal transmitted by an electronic device used a user who is present with the item of interest; confirming, by the article-identification-and-location device, the user electronic device is permitted to receive environmental data from the article-identification-and-location device in response to the information received in the RF signal transmitted by the user electronic device; transmitting, by the article-identification-and-location device, after confirming the user electronic device is permitted to receive environmental data from the article-identification-and-location device, an RF signal that conveys environmental data corresponding to the measured environmental condition of the item of interest; and pairing, by the user electronic device, a current geographical location of the item of interest with the environmental data corresponding to the measured environmental condition of the item of interest that is conveyed by the RF signal transmitted by article-identification-and-location device, to produce a data point representing the measured environmental condition of the item of interest at the current geographical location of the item of interest.

In one embodiment, the step of confirming the user electronic device includes permitting the user electronic device to receive environmental data from the article-identification-and-location device includes comparing the information received in the RF signal transmitted by the user electronic device with a unique identifier that is stored in memory of the article-identification-and-location device and associated with both the item of interest and the user present with the item of interest.

In one embodiment, the method further comprises the step of determining, by the user electronic device, a geographical location of the user electronic device, to establish thereby the current geographical location of the item of interest.

In one embodiment, the method further comprises the step of transmitting, by the user electronic device to a customer electronic device over a communications network, a message conveying the data point representing the measured environmental condition of the item of interest at the current geographical location of the item of interest.

In one embodiment, the method further comprises the step of displaying, on the customer electronic device, a real-time representation of the current geographical location of the item of interest and the measured environmental condition of the item of interest using the data point received from the user electronic device.

In one embodiment, the method further comprises the step of recording a plurality of data points representing measured environmental conditions of the item of interest at geographical locations along a route taken by the user who is present with the item of interest.

In another aspect, the invention is related to a system comprising an article-identification-and-location (A-I-A-L) device physically coupled to an item of interest, the A-I-A-L device including at least one sensor, a radiofrequency (RF) transceiver, and a processor in communication with the RF transceiver and the at least one sensor, the at least one sensor adapted to measure a condition of an environment of the item of interest; and an electronic device used a user who is present with the item of interest, the electronic device having an RF transceiver and a processor in communication with the RF transceiver of the electronic device. The RF transceiver of the A-I-A-L device receives information in an RF signal transmitted by the RF transceiver of the user electronic device, the processor of the A-I-A-L device confirms the user electronic device is permitted to receive environmental data from the A-I-A-L device in response to the information received in the RF signal transmitted by the RF transceiver of the user electronic device, and the RF transceiver of the A-I-A-L device transmits, after the processor of the A-I-A-L device confirms the user electronic device is permitted to receive environmental data from the A-I-A-L device, an RF signal that conveys environmental data corresponding to the measured environmental condition of the item of interest. The user electronic device pairs a current geographical location of the item of interest with the environmental data corresponding to the measured environmental condition of the item of interest, to produce a data point representing the measured environmental condition of the item of interest at the current geographical location of the item of interest.

The A-I-A-L device can further include memory storing a unique identifier associated with the item of interest and with the user present with the item of interest, and the processor of the A-I-A-L device confirms the user electronic device is permitted to receive environmental data from the A-I-A-L device by comparing the information received in the RF signal transmitted by the user electronic device with the stored unique identifier. The user electronic device can be configured to determine a geographical location of the user electronic device and to equate the current geographical location of the item of interest with the determined geographical location of the user electronic device. The system can further comprise a customer electronic device in communication with the user electronic device over a communication network, and wherein the user electronic device transmits to the customer electronic device over the communication network a message conveying the data point representing the measured environmental condition of the item of interest at the current geographical location of the item of interest. The customer electronic device can include a processor configured to execute an application that displays a real-time representation of the current geographical location of the item of interest and the measured environmental condition of the item of interest using the data point received from the user electronic device.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Computerized systems, methods, and article-identification-and-location devices described herein help store associates and customers find products—also referred to herein as items of interest or target items—set aside for them at an establishment, for example, a retailer. For example, the establishment can have an online presence by which customers can select the business's product(s) and request that such product(s) be set aside, with the intention of visiting the business, in person, to look them over, try them on, or pick them up. When a customer selects a product, the system notifies business personnel, who affixes, attaches, or places an article-identification-and-location device on or near the product (in some embodiments, the article-identification-and-location device is integrated into the product or the packaging of the product). When the moment comes to access the product, whether by a customer or by store personnel, the article-identification-and-location device activates an indicator, for example, a light or speaker, to lead the person seeking the product to its location.

As another example, system, methods, and article-identification-and-location devices can be used with items of interest that have been delivered to a storage facility, a package room (e.g., residential), locker system, or the like. A customer may be notified (e.g., electronically) that a package has arrived at the establishment and been placed in a package room awaiting self-pickup. Personnel can attach the article-identification-and-location device to the package, or the package may already be equipped with the article-identification-and-location device, before placing the package in the package room. When the customer arrives to pick up the package, the article-identification-and-location device activates an indicator to help the customer locate the specific item of interest in the package room.

Figure 1:
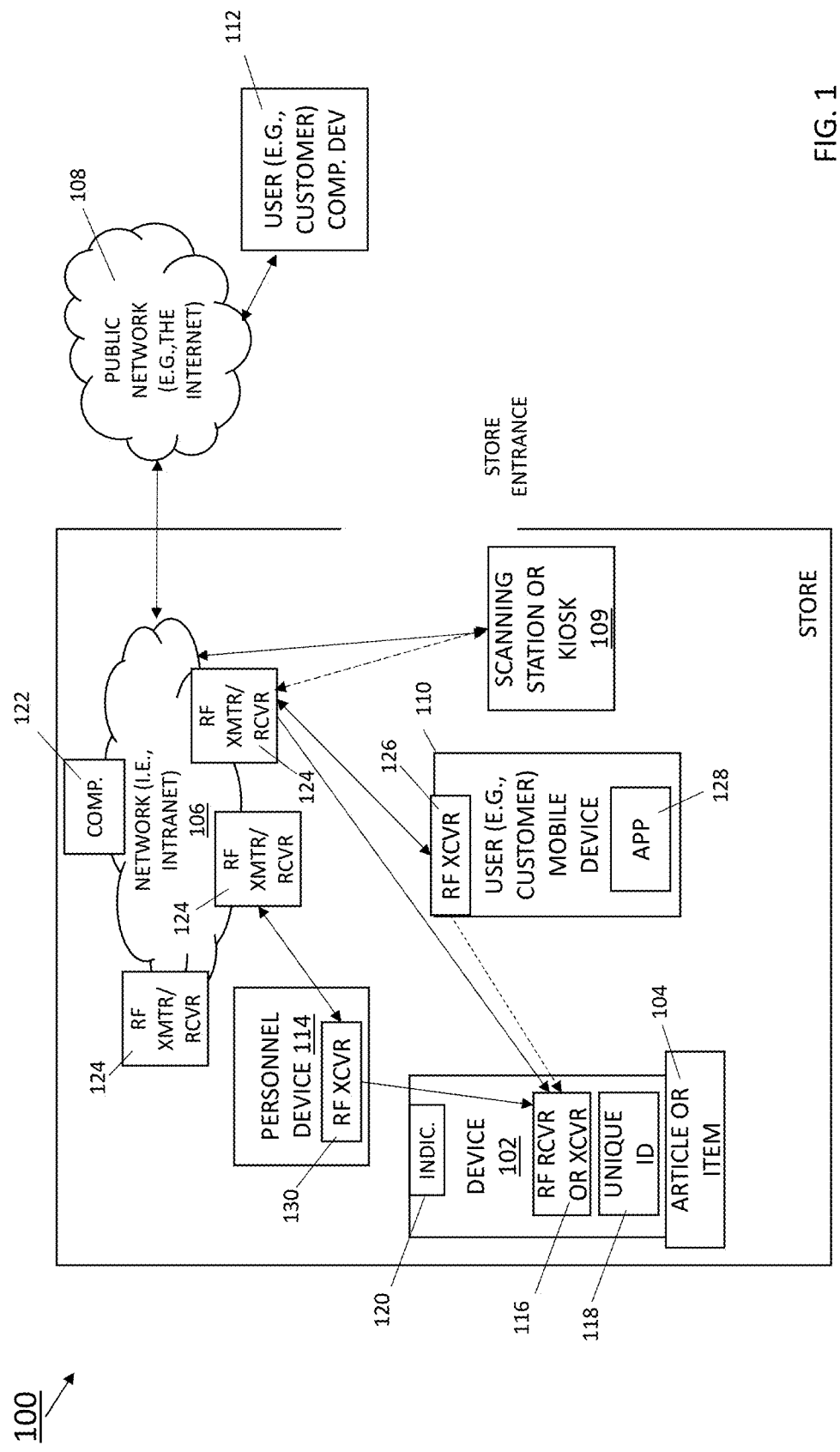
FIG. 1 is a block diagram of an embodiment of a system for helping personnel and customers locate and pick-up items in a store, for example, that the customers have ordered remotely.

FIG. 1 shows an embodiment of a system 100 for helping users, which include customers, shoppers, and store personnel, locate and pick-up items within a building of an establishment, business, store, or organization, that have, for example, been ordered on-line or by telephone. The system 100 includes an article-identification-and-location device 102 coupled directly or indirectly to an item of interest 104, a private network (i.e., intranet) 106 in communication with a public network (e.g., the Internet) 108, and, optionally, a scanning station or kiosk 109 (referred to generally as a user interface device) in wireless or wired communication with the private network 106.

The customer preferably, but not necessarily, carries a mobile device 110 when arriving at the store to pick-up the item of interest. A customer computing device 112 may be in communication with the public network 108 by which the customer places the order for the item of interest.

Optionally, a computing device 114, used by personnel of the store, referred to hereafter as personnel device 114, is in communication with the article-identification-and-location device and the private network 106, to program the article-identification-and-location device with a unique identification code (also referred to as unique identifier or unique code) 118 and send the unique identifier to the private network, as described later in more detail.

The optional scanning station or kiosk 109 is a computerized system that provides a user interface through which customers can request a pickup of an item of interest and scan, enter, or select information.

Embodiments of the system 100 can have none or one or more, in any combination, of the customer mobile device 110, personnel device 114, and kiosk 109.

The article-identification-and-location device 102 includes a radiofrequency (RF) receiver 116, memory (not shown) that stores the unique identifier 118, and an indicator 120. Article-identification-and-location devices can be manufactured with circuitry to acquire information from only a certain band of frequency. Thus, the circuitry makes a given article-identification-and-location device selective. Being manufactured to catch different frequencies, different article-identification-and-location devices can be communicated with individually without the need for unique identifier verification. Embodiments of the article-identification-and-location device 102 can be either an "add-on" or "built-in" feature of the item of interest 104 or of the packaging or container of the item that the article-identification-and-location device is assigned to identify. Accordingly, embodiments of the article-identification-and-location device can have a variety of forms.

For example, the article-identification-and-location device 102 can be designed to snap around, like a bracelet with a clasp, or slide over the neck of a hanger, like a donut ring, from which hangs an article of clothing (i.e., the item of interest). Another example embodiment of the article-identification-and-location device can be adapted to snap around or slide over multiple hangers (for instance, in the event the customer has identified multiple articles of clothing or garments).

As another example, the article-identification-and-location device 102 can be a clip for attaching to articles, such as clothing, bags, footwear. Further, the principles described herein extend to various other embodiments of the device, examples of which include, but are not limited to, tags, labels, rings, tickets, stickers, fasteners, and coasters.

Moreover, article-identification-and-location devices 102 need not be attached to the articles themselves, but closely associated with them; for example, an article-identification-and-location device may be placed on top of a loose pile of clothes folded and placed upon a table, where the clothes await pick up by a specific customer, or the article-identification-and-location device may be attached to or embodied in an article carrier or holder, examples of which include, but are not limited to, bags, boxes, plates, shipping containers, and carts. In such examples of close association, the article-identification-and-location device is considered indirectly coupled to the article or item of interest.

The RF receiver 116 of the article-identification-and-location device 102 receives radio signals in accordance with a wireless communication technology, examples of which include, but are not limited to Bluetooth®, Bluetooth Low Energy (BLE), 802.XX (where "XX" signifies the family of the wireless and mobile standards), wireless local area network (WLAN) and ultra-wideband (UWB). The RF receiver may be part of an RF transceiver having RF signal receiving and transmitting capabilities. In such an embodiment with the RF transceiver, the article-identification-and-location device can wirelessly broadcast the unique identifier 118 periodically, or wirelessly transmit the unique identifier in response to an interrogation from another device, for example, the personnel device 114 or other device on the private network 106. The RF transceiver can also send messages that report sensed changes of state or by which the private network 106 can determine the article-identification-and-location device is still operational. The frequency of such broadcasts can change, depending upon circumstances, for example, an increased broadcast frequency in response to a detected change of state.

The unique identifier 118 is a unique value given to the article-identification-and-location device 102. Values for unique identifier 118 can be a network identifier (e.g., a MAC address) or randomly or pseudo-randomly generated or derived from other information, for example, product information, customer identification, or customer information. Examples of product information include, but are not limited to, a stock keeping unit (SKU) number, a universal product code (UPC), and machine-readable codes, for example, barcodes and QR codes. Customer identification is information related specifically to identifying a specific customer, for example, the customer's name, address, membership number (or ID) at a store, IP address, mobile phone number. Customer information can include any type of information associated with a customer request, examples of which include, but are not limited to, an order number, any of the aforementioned product information, any of the aforementioned customer identification, or any combination thereof.

The unique identifier 118 can be a preset value, namely, programmed into the article-identification-and-location device during or shortly after the article-identification-and-location device's manufacture (or any time before use with a specific item of interest). This preset unique identifier 118 may never change, that is, the preset value of the unique identifier 118 may be permanently associated with the given article-identification-and-location device 102.

Alternatively, the unique identifier 118 can be a dynamically assigned value, namely, programmed at the time of the article-identification-and-location device's use in the field. The value of the unique identifier 118 dynamically assigned to a given article-identification-and-location device 102 may or may not change, that is, the value of the unique identifier 118 may be temporarily or permanently associated with the given article-identification-and-location device 102. The personnel device 114, the private network 106 (e.g., the computing system 122 on the network), or both can maintain a record of the unique identifier programmed in each article-identification-and-location device.

The indicator 120 of the article-identification-and-location device 102 is an output device by which the article-identification-and-location device, when triggered to produce a notification, as described herein, can attract attention to itself and, thus, to the item of interest 104 to which the article-identification-and-location device is coupled. Example embodiments of the indicator include a light-emitting diode (LED) and a speaker. In an another embodiment, the indicator 120 is remote from, rather than included in, the article-identification-and-location device (but within wireless communication range), and the article-identification-and-location device further comprises an RF transmitter; when triggered to produce a notification the article-identification-and-location device is configured to transmit RF signals that turn on the remote indicator 120.

The item of interest 104 can be any article made available by the business to customers for self-service pickup or perusal, examples of which include, but are not limited to, articles of clothing, footwear, tools, bags of items, such as groceries, and restaurant take-out orders.

The private network 106 includes a computing system 122 (with processor(s) and memory) and at least one RF transceiver (i.e., an RF receiver and an RF transmitter) 124 that are connected to the computing system 122. Program code executing at the computing system 122 uses these RF transceiver(s) to manage the article-identification devices. The computing system 122 can be part of a server system (not shown) used to handle customer orders and manage associations between article-identification-and-location devices 102 and customer-ordered items of interest 104. Although computing system 122 is shown to be within the store, it may reside instead at other sites, such as on a third-party network of computers and servers referred to broadly as "the cloud." The one or more RF transceivers 124 transmit and receive radio signals in accordance with a wireless communication technology, such as those previously mentioned.

In some embodiments of the system 100, the computing system 122 directs the RF transceiver 124 to send data to the RF receiver 116 of the article-identification-and-location device 102 to activate the article-identification-and-location device in response to data received by the RF transceiver 124 from the customer mobile device 110 or kiosk 109.

In one embodiment, each RF transceiver 124 is a beacon (e.g., a BLE beacon), which includes a low-energy RF transmitter and a microcontroller or processor that can be programmed to operate with logic. To communicate with such RF transceivers, the computing system 122 has an RF transceiver, too, enabling the computing system to be the main manager of the article-identification-and-location devices and tie to personnel and customer, and helps simplify the logic on the beacons.

Alternatively, the RF transceiver beacon(s) 124 act as computers on the private network and can manage the article-identification-and-location devices. In these embodiments, each of these RF transceiver beacons is capable of controlling the article-identification-and-location device through RF signaling, and of receiving RF signals from other RF-capable devices, for example, the customer mobile device 110 and personnel device 114. In effect, the beacons function like the computing system 122 (and the computing system 122 is not needed) and can communicate directly with a server.

In yet another embodiment, radiofrequency signaling is not used, and the article-dentification-and-location devices are connected into the system 100 by private wireless Ethernet; in this embodiment, Ethernet beacons are used instead of RF transceivers.

The private network 106 provides a wireless Ethernet network to which other wireless devices, including those carried by members of the public, such as the customer mobile device 110, or of staff, such as the personnel device 114, are allowed to connect.

The private network 106 is in communication with the public network 108 using primarily TCP/IP communication protocols. The public network 108 hosts innumerable websites by which various businesses publicly present their assortments of wares.

The customer mobile device 110 includes an RF transceiver 126 and runs a computer-executed application (referred to as an "app") 128 (i.e., application program) that can be downloaded to the customer mobile device 110 from an "app store" on a public network. When executed, this app provides a user interface by which the customer can send customer information, for example, customer name and address, order information, barcode information, and the like, to the RF transceiver 124 on the private network 106.

Alternatively, the customer mobile device can send a message bearing the customer information over TCP/IP to the computer 122 on the private network. Such information, when received by the private network 106, is used by the computing system 122 to cause one of the article-identification-and-location devices 102 to activate, as described in more detail in connection with FIG. 2. In the event the customer does not bring the customer mobile device 110 when visiting the store, the customer can provide the applicable customer information to the store personnel, and personnel can transmit the customer information to the private network 106, for example, through the personnel device 114 or the kiosk 109. In one embodiment, shown in dashed lines, the app 128 can cause the RF transceiver 126 of the customer mobile device 110 to broadcast signals that can operate to cause one of the article-identification-and-location devices 102 to activate, as described in more detail in connection with FIG. 3. Embodiments of the customer mobile device 110 include, but are not limited to, smartphones (e.g., iPhone®, Galaxy®), personal digital assistants (PDAs), and tablets.

The customer computing device 112 includes a browser (not shown) by which to access webpages, such as those of the store, on the public network 108. Through the webpages, the user can place orders for one or more products of the store and arrange for in-store pickup. The customer computing device 112 may be the same or a different computing device from the customer mobile device 110. Alternatively, the customer may telephone personnel at the store, place an order verbally, and personnel can then enter the customer information related to the placed order into the private network 106. As another alternative, the customer may come to the store premises, place the order within the store, for example, at an information or help desk or at the kiosk 109, and staff (or an automated system) can then enter the customer information into the private network 106.

The personnel device 114 has an RF transceiver 130 capable of wireless communication with the RF receiver (or transceiver) 116 of the article-identification-and-location devices 102, with the RF transceiver(s) 124 of the private network 106, and with the RF transceiver 126 of the customer mobile device 110, using a wireless communication technology, for example, one of those previously mentioned. Embodiments of the personnel device 114 include, but are not limited to, a tablet, laptop, and a smartphone. Store staff can use the personnel device 114 to enter customer information into the system 100, program article-identification-and-location devices 102 with unique identifiers, or send unique identifiers to customer mobile devices 110, as described herein.

Figure 2:
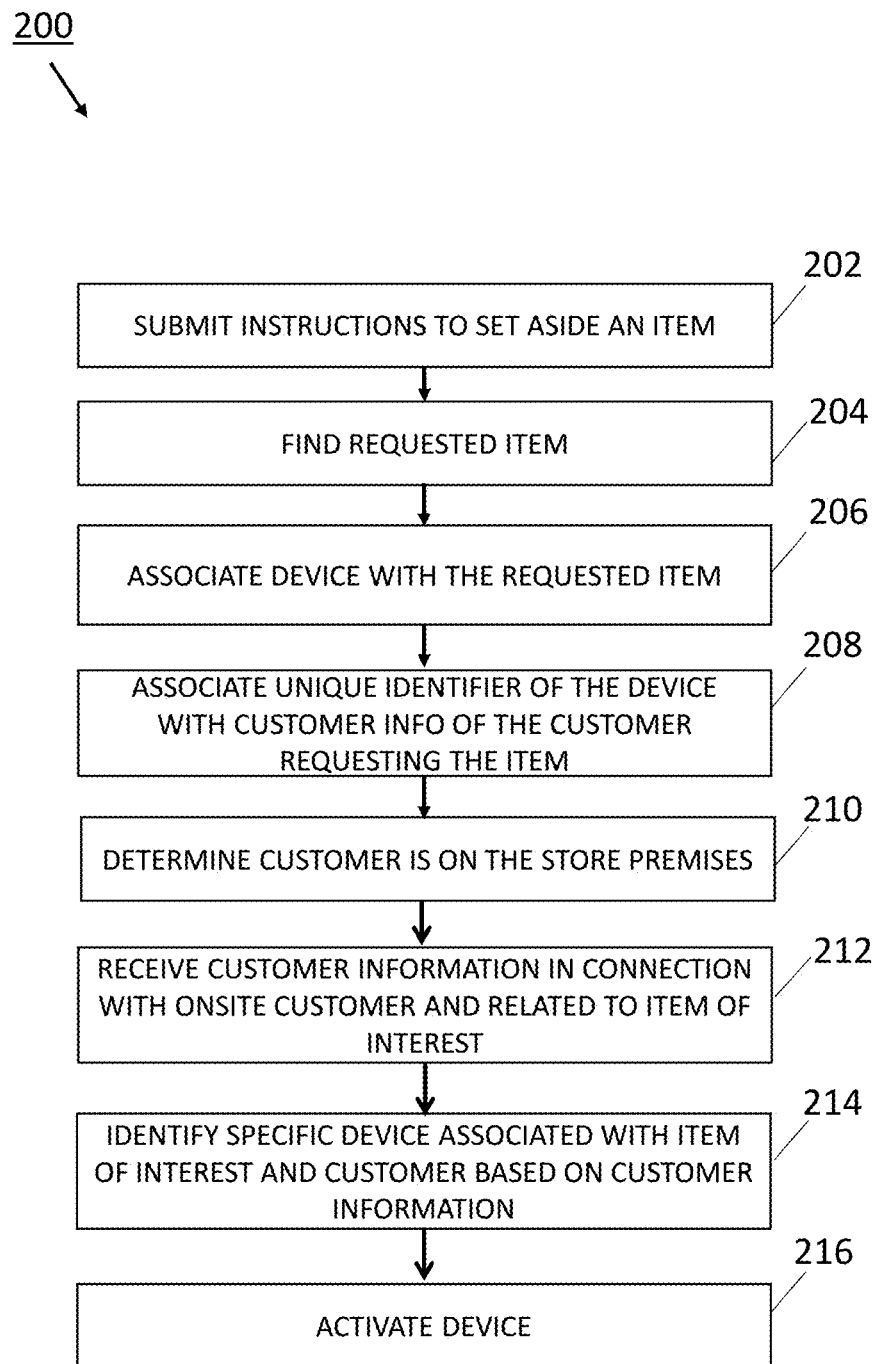
FIG. 2 is a flowchart of an embodiment of a process for guiding personnel and customers to store items in which the customers have expressed an interest and requested be set-aside for pickup.

FIG. 2 shows an embodiment of a process 200 for guiding customers to a store's items in which they have expressed an interest and requested they be set-aside for self-service pickup. In the description of the process 200, reference is made to various elements of the system 100 shown and described in FIG. 1. To illustrate the process 200 by example, consider an establishment that is in the business of selling articles of clothing, and a potential customer who has identified a suit he or she is interested in trying-on and wants the establishment to set that suit aside for self-service pickup. In this example, the customer uses the customer computing device 112 to submit (step 202) instructions online, through a website of the establishment on the public network 108, to set aside the suit for pickup or examination. Alternatively, the customer makes the request telephonically or in person at the store.

After becoming aware of the customer request, store personnel find the identified suit within the establishment (step 204). In one example, the private network 106 of the establishment receives the customer's request from the public network 108, and the RF transceiver 124 on the private network 106 sends the request to the RF transceiver 130 of the personnel device 114 (using, e.g., RF or TCP/IP). The requesting customer, store personnel, the private network, or any combination thereof, generates or provides customer information associated with the customer request, which can be stored in the computing system 122 on the private network 106, on the personnel device 114, or both.

The store personnel can then set the suit aside. For example, personnel can hang the suit in a coatroom or other area specifically designated for articles awaiting customer retrieval. Alternatively, the store associate can leave the suit in its present location. The area can hold many articles, each associated with an article-identification-and-location device and waiting for pickup by a specific customer.

At step 206, the suit is associated with an article-identification-and-location device 102. This association of the article-identification-and-location device with the identified article (e.g., the suit) can be accomplished in a variety of ways; some ways may use light guidance or sound notifications to guide personnel to pick a specific article-identification-and-location device, other ways allow personnel to select any article-identification-and-location device. Personnel can then make the association by attaching the article-identification-and-location device to the item, placing the device on or near the item, or placing the item on or near the device. In another example, the item may already have the article-identification-and-location device attached to it, near it, or built into it, and in such instances the association is pre-established.

In another example, personnel are guided to the article-identification-and-location device by its activating, and thus, the decision as to which article-identification-and-location device to associate with the item of interest is done without personnel involved in the device selection. In this example, personnel's action of attaching the article-identification-and-location device to the item of interest serves to verify completion of the association. If the article-identification-and-location device is configured with sensors to sense change of state (motion, angular, contact), communication of this change can serve as verification. If the article-identification-and-location device does not have any such sensors, personnel can scan a barcode, optical character recognition, or text on the article-identification-and-location device can be used for verification.

In situations where personnel choose the article-identification-and-location device, the association can be made by a scan of a barcode, optical character recognition, or text on the article-identification-and-location device, irrespective of whether the device has any sensors. If the article-identification-and-location devices have sensors, the private network can monitor broadcasts from the article-identification-and-location devices to check which one of them has entered the closed state. The information representing a closed state depends on the type of sensor collecting the data. For example, a contact sensor indicates whether the clip state changes from closed to open, and an angular sensor provides a value between 0 and a predetermined amount and persisting it. This computation of detecting states of the article-identification-and-location devices occur at the computing system 122 on the private network 106 as the article-identification-and-location devices broadcast the data when they detect state changes. Alternatively, the article-identification-and-location devices can be configured to make these computations and report a state change to the personnel device 114 or computing system 122 on the private network.

At step 208, the unique identifier 118 of the article-identification-and-location device 102 associated (in step 206) with the suit is further associated with the customer information of the given customer who requested the suit be placed aside. The personnel device 114, the private network 106 (e.g., the computing system 122), or both can establish, maintain, and record this unique association between the article-identification-and-location device, located near or on the suit, and the customer information. In effect, this step operates to uniquely associate this article-identification-and-location device to the given customer who placed the order for the suit.

This unique association can be produced in various ways. For purposes of describing some ways for how such associations are made, two definitions are provided: "decider" and "associator". A decider is a device on the private network that decides if the article-identification-and-location device has entered a "coupled state", namely, as detectable state in which it has been put with the item of interest. An associator is a device on the private network that associates the unique identifier of the article-identification-and-location devices with customer information. It is to be understood that the decider and the associator can be the same device.

A decider can be the personnel device 114 when it is RF capable, the computing system 122 on the private network listening through its transceiver 124, or, as an extension of what was previously described, the transceiver beacon equipped with a processor. The decider takes care of the article-identification-and-location devices' end; the decider listens to the broadcasts from and manages the article-identification-and-location devices. A given article-identification-and-location either reports raw sensory data that the decider analyzes and decides if the given article-identification-and-location has been entered the "coupled" state, or the given article-identification-and-location analyzes the raw data it collected and sends broadcasts about its "coupled state". The decider knows which article-identification-and-location has gone into "coupled state" and is ready to pass it along to the associator.

The associator can be a server, the computing system 112 on the private network or the personnel device. The associator has the customer information when the decider sends it the unique identifier of a given article-identification-and-location; the associator then associates the unique identifier with the customer information.

In a first example of making the unique association, in which the article-identification-and-location device is already pre-programmed with the unique identifier 118, personnel (or the system 100) acquire the value of this unique identifier from the article-identification-and-location device before associating the value with the customer information. Personnel can acquire the value of the unique identifier by using their personnel device 114 to interrogate the article-identification-and-location device 102, provided the article-identification-and-location device is configured with an RF transmitter and can thus respond to the interrogation. Otherwise, for an article-identification-and-location device configured with an RF receiver, but no RF transmitter, personnel can determine the value of the unique identifier by other means, such as from an imprinting of the unique identifier on the article-identification-and-location device itself or from a unique manufacturer's serial number on the article-identification-and-location device that can be correlated to the unique identifier value. (In this instance, whichever device is scanning the unique identifier is the decider and the associator can be any of the devices previously described). Another means can be that the article-identification-and-location device is permanently built into the item of interest 104, and the information about that item stored on the private network 106 includes the value of the unique identifier. In another embodiment, the article-identification-and-location device has a passive RFID that can be scanned to obtain the article-identification-and-location device's unique identifier. Using light or sound guidance or scanning the device to read its passive RFID can tell personnel whether they have correctly picked the correct article-identification-and-location device.

In a second example in which the unique identifier 118 is not a preset value, store personnel can use their personnel device 114 to dynamically determine and program its value into the article-identification-and-location device 102 over a wireless communication link. The value of this new unique identifier may be derived from the customer information associated with the given customer who placed the order for the suit. An application program running on the personnel device 114 can keep a record of the unique identifier values currently in use and dynamically acquire the new unique identifier value. Over another wireless communication link, the personnel device 114 can then communicate the new unique identifier value associated with both the article-identification-and-location device and the customer information to the private network 106. Alternatively, the private network 106 can be the keeper of unique identifier values currently in use, produce the new unique identifier in response to the order placed by the given customer, and provide its value in response to a request from the personnel device 114 or the kiosk 109 if the kiosk is being used to process orders instead of the personnel device.

Accordingly, in the first example, the unique identifier 118 is initially (and permanently) associated with article-identification-and-location device 102 and subsequently (and temporarily) associated with a given customer. In the second example, the unique identifier can be initially (and temporarily or permanently) associated with a given customer and subsequently (and temporarily) associated with the article-identification-and-location device.

The following example illustrates ways of associating unique identifiers of article-identification-and-location devices with customer information. Consider a customer has placed an order into a store for two items, a pair of shoes and a pair of socks. A server (e.g., computing system 122) receives this information and generates an order ID. The server can also generate items IDs, for example, a first ID for the shoes and a second ID for the socks. The order ID and item IDs are referred to herein as customer information (or customer IDs). In addition, for the purposes of this example, an article-identification-and-location device is placed with each item (i.e., there are two article-identification-and-location devices, one with the shoes, the other with the socks).

The associations of the unique identifiers of these article-identification-and-location devices with a customer ID (i.e., order ID or item ID) can be made in at least two ways: 1) each unique identifier of the article-identification-and-location devices is paired with a different one of the two item IDs (both items IDs are linked to the order ID at the server), accordingly, one customer ID is associated with one unique identifier of an article-identification-and-location device, referred to as a 1:1 association; and 2) both unique identifiers of the two article-identification-and-location devices are paired to the order ID, accordingly, one customer ID is associated with multiple unique identifiers of article-identification-and-location devices, referred to as a 1: many association.

In the instance of a 1:1 association, a customer can see on the user interface (e.g., on the customer mobile device or the kiosk) which item the customer is picking up. The user interface can show where to pick up the shoes and where to pick up your socks, that is, the user interface identifies the items being picked up in addition to their locations. In the instance of a 1: many association, the user interface shows the locations of the items but does not identify the item.

At step 210, the private network is aware of the customer on store premises. This awareness can arise from a variety of ways. In one example, when the customer with the customer mobile device 110 comes within communication range, the RF transceiver 124 on the private network 106 automatically establishes communications with the customer mobile device 110. From these communications, the private network 106 identifies the customer and recognizes the customer as on-site.

In other examples, the customer (with or without the customer mobile device 110) starts an item pickup process by approaching store staff (e.g., at a help desk, information desk, register of the store) or an in-store station (or kiosk 109) configured for facilitating customer self-service pickup. In the former instance, personnel through the personnel device 114 can inform the private network 106 of the customer's physical presence by passing customer information to the private network; in latter instance, the kiosk can inform the private network 106 of the customer's arrival, also by passing customer information, received from its interaction with the customer, to the private network.

With the customer known to be on the premises, the private network 106 receives (step 212) customer information associated with the item of interest 104 to be picked up by the given customer. For example, the customer can log into the app 128 running on the customer mobile device 110 and select a pick-up feature offered by the app. The app then wirelessly communicates with the computing system 122 in the business's location, passing the relevant customer information needed to identify the item of interest 104 set aside for the customer. The customer information may be received from the customer mobile device 110 as part of these initial (or subsequent) communications between the customer mobile device 110 and the private network 106, the very same communications the private network can use to determine the customer is on the store premises (i.e., step 210).

As another example, personnel can acquire the customer information during their interaction with the customer, for example, through communications with the app 128 running on the customer mobile device 110 or from face-to-face communications at the help desk, and enter this customer information into the system 100 through the separate personnel device 114.

Yet another example, the customer can scan a QR code (or other machine-readable code) at the scanning station or kiosk 109, and the scan obtains and sends the customer information to the computing system 122 on the private network 106. The scan thus operates to inform the private network 106 of the customer's on-site presence (i.e., step 210) and to supply (i.e., step 212) the customer information to the private network. The customer may receive this QR code (or other code) in response to ordering the item of interest (i.e., suit) online, as described in step 202. Before arriving at the store, the customer provides the QR code to the app 128 on the customer mobile device 110.

The private network 106 uses the customer information to identify (step 214) the specific article-identification-and-location device 102 associated with the received customer information. For this identification, the computing system 122 can maintain a database, spreadsheet, or other the like, that cross-references article-identification-and-location devices 102 and their unique identifiers 118 with customer information. Alternatively, the computing system 122 can maintain separate accounts for each of the business's customers and include in each customer account the unique identifier 118 of each article-identification-and-location device 102 used for an item of interest set aside for that customer.

At step 216, the private network 106, namely, the computing system 122 communicating through the RF transceiver 124, makes a wireless connection to a specific article-identification-and-location device 102 to activate it. Activation, in this context, means to cause the article-identification-and-location device to operate its indicator 120 to draw attention to its location. If a given customer is coming to pick up multiple items of interest, the private network makes a wireless connection to each specific article-identification-and-location device associated with the given customer to activate them.

For example, in one embodiment, the computing system 122 causes the RF transceiver to transmit RF signals with the unique identifier 118 associated with the specific article-identification-and-location device. From among many article-identification-and-location devices that may be deployed in the store, only the specific article-identification-and-location device with a stored unique identifier that matches the unique identifier in the communications from the private network 106 activates itself, whereas the other article-identification-and-location devices with non-matching unique identifiers do not. For multiple items of interest, the private network activates each specific article-identification-and-location device associated with the given customer by transmitting RF signals with the unique identifiers associated with those specific article-identification-and-location devices.

In another embodiment, the computing system 122 establishes a one-to-one wireless connection with the specific article-identification-and-location device 102. For example, consider a BLE embodiment in which the article-identification-and-location devices 102 operate as peripheral devices that broadcast information about themselves using advertising, and in which the RF transceiver 124 on the private network 106 operates as a central device. After transmitting an advertisement, each article-identification-and-location device 102 turns on its receiver 116 for a set window of time. As the central device, the RF transceiver 124 scans for advertisements.

Because the computing system 122 seeks to establish a connection with the specific article-identification-and-location device (determined in step 214), the central device analyzes received advertisements, looking for one from the specific article-identification-and-location device. Upon discovering such an advertisement, the central device sends a wireless connection request to the specific article-identification-and-location device within the set window of time after having received the advertisement.

By receiving the connection request within the set window of time, the specific article-identification-and-location device accepts the one-to-one connection with the RF transceiver 124 and receives a message from the computing system 122 directing the specific article-identification-and-location device to turn on its indicator. Unlike the previously mentioned embodiment, this embodiment process does not require the specific article-identification-and-location device to compare a unique identifier received from the RF transceiver 124 with a unique identifier stored at the specific article-identification-and-location device.

The processor of the activated article-identification-and-location device 102 turns on the indicator 120 (e.g., an LED if configured with one), with the purpose of notifying the customer of the location of the item of interest. The LED can flash green, for example, and may turn on after the customer comes within a certain distance of the article-identification-and-location device, a distance calculated by the processor of the article-identification-and-location device 102 based on the RF signals (e.g., signal-strength, angle of arrival or time of arrival measurements) arriving from the customer mobile device 110.

In practice, multiple customers, store personnel, or both may be concurrently arriving at a designated pick-up area to pick-up items associated with article-identification-and-location devices 102. To distinguish among the multiple personnel, the computing system 122 on the private network 106 may color code the LED or emit a specific tone on the article-identification-and-location devices, or a combination thereof, to help identify which article-identification-and-location device is designated for which customer or staff member. The user interface of the personnel device 114 used by each staff member or the user interface of the customer mobile device 110 used by each customer guides that person to look for a specific LED, audio pattern, or combination thereof.

Geofencing principles may further guide the customer to the article-identification-and-location device 102; the app 128 running on the customer's mobile device 110 has obtained the unique identifier of the sought-for article-identification-and-location device (obtained from the private network, over TCP/IP or RF), the article-identification-and-location device broadcasts this unique identifier (for those embodiments in which the article-identification-and-location device is equipped with an RF transmitter), and the customer mobile device can use RSSI measurements, angle of arrival, or time of arrival measurements based on the RF signals it determines have been transmitted by the article-identification-and-location device 102. Alternatively, or in combination, the private network 106 can use signal strength or angle of arrival measurements based on RF signals transmitted by the customer's mobile device 110 (if the article-identification-and-location device 102 is transmitting) that are received by multiple RF transceivers 124, and communicate with the app 128 running on the customer mobile device 110 to navigate the customer to the article-identification-and-location device 102. The customer may already be familiar with where such items of interest are held within a given store of self-pickup and may not require such guidance and may optionally disable this guidance feature in the app 128.

When the customer arrives at the article-identification-and-location device's location to take the item of interest, the article-identification-and-location device 102 can employ one or more mechanisms to avoid mistakes, such as taking the wrong item. Avoiding mistakes requires correlating a sensed change of state of the article-identification-and-location device 102 with the valid customer. Sensed changes of state include, but are not limited to, temperature changes (e.g., the article-identification-and-location device becomes warmer when a person holds it), angular changes, contact change, and movement.

The valid customer is he or she whose customer mobile device 110 wirelessly broadcasts the unique identifier that matches the unique identifier stored in the article-identification-and-location device 102, provided the valid customer has previously received the unique identifier (e.g., from the personnel device 114 or private network 106), at the moment of the sensed change of state. Information other than this unique identifier can be used to validate the customer, for example, the aforementioned customer information or customer identification, provided such information is stored at some prior moment in the article-identification-and-location device 102 so that the article-identification-and-location device 102 can compare it with the customer information or customer identification broadcast by the customer mobile device 110.

As each personnel or customer nears the given article-identification-and-location device 102, the personnel or customer's mobile device 110 wirelessly broadcasts a unique identifier. If the article-identification-and-location device 102 receives (different) unique identifiers from multiple customers (or store personnel) who are in communication range, the article-identification-and-location device 102 picks the unique identifier received from the device 110, 114 that is closer (e.g., greatest signal strength or shortest timing measurement). Otherwise, when the article-identification-and-location device 102 senses change of state, it would not know whether the correct person has taken the item (since it received unique identifiers from multiple RF transmitters). A comparison, made by the article-identification-and-location device 102, between the stored unique identifier with the unique identifier received from the closest device 110, 114 determines whether the correct person picked up the item. Alternatively, the computing system 122 on the private network 106 can make the determination of whether the correct person picked up the item based on received broadcasts from the article-identification-and-location device. Such broadcasts from the article-identification-and-location device include data related to the sensed change of state and signal strengths or timing measurements of RF signals received from multiple mobile devices 110, 114.

In one embodiment, the system is programmed to have the customer mobile device 110 tap the article-identification-and-location device 102 to receive a full strength RSSI signal, which is when the article-identification-and-location device makes the identifier comparison. The article-identification-and-location device picks whichever customer mobile device tapped it. The tap can be recognized, for example, by RSSI strength or by using the accelerometer of the article-identification-and-location device. In the latter instance, upon detecting a spike in the accelerometer, the article-identification-and-location device looks for RSSI signals above a threshold. If multiple RSSI signals exceed the threshold, the article-identification-and-location device chooses the RSSI signal with the highest energy signal. If, as the article-identification-and-location device senses a change of state, while receiving RSSI signals from multiple customer mobile devices, but no RSSI signals are above a certain threshold (whether by tap or proximity), the article-identification-and-location device deems this occasion to be an incorrect pickup.

When attempting to avoid mistakes, the article-identification-and-location device can perform one or more of a variety of actions. The article-identification-and-location device can send the information it's gathered from the customer mobile device(s) to the private network 106, where the computing system 122 can make the determination if the correct customer mobile device is picking up the item of interest. Alternatively, or in addition, if an incorrect pickup is detected, the involved article-identification-and-location device can communicate directly to the customer mobile device closest in proximity (the invalid customer) and to the correct customer mobile device (the valid customer) to notify that a mistake is in progress.

To sense changes of state, the article-identification-and-location device 102 may be configured with one or more of a variety of sensors. For example, if is configured with an accelerometer and a speaker, the article-identification-and-location device concludes the wrong customer is removing the product if the unique identifier received from the customer's mobile device 110 does not match the unique identifier programmed in the device's 102 memory, or the article-identification-and-location device 102 has no stored unique identifier at all, when the accelerometer detects motion of the article-identification-and-location device 102. At that moment, the article-identification-and-location device's processor may be configured to alert the customer that he or she is removing the wrong item by causing the speaker to sound an alarm or the LED to flash red, depending upon the type of indicator(s) 120 the article-identification-and-location device is equipped with.

As another example, if the article-identification-and-location device 102 is a clothing-clip configured with a contact sensor, the article-identification-and-location device can know whether the clip is open or closed; if configured with an angular Hall sensor, the article-identification-and-location device can detect a differential in the angle between the clothing-clip's two opposing arms. When the article-identification-and-location device senses the clip is open (if configured with a contact sensor) or detects a differential in angle (if configured with an angular Hall sensor), a comparison between the stored unique identifier with the unique identifier received from the closest customer mobile device 110 (or personnel device 114) verifies whether the correct person picked up the item. The article-identification-and-location device's processor may be configured to audibly and/or visually alert the customer or personnel immediately that they are removing an item not intended for him or her.

Additional examples of detecting change of state involve geofencing principles used to set up zones in which article-identification-and-location devices are programmed to be in certain states (or instructed by the computing system 122 on the private network, which monitors the article-identification-and-location devices, to set their states).

For example, consider an article-identification-and-location device 102 that is in the "coupled state" while it resides in a given zone (e.g., a certain room), and it is determined (by the device 102 or by the private network 106) that the article-identification-and-location device has exited the zone without having entered the "indicate state". The "indicate state" corresponds to when the article-identification-and-location device has been notified to activate its indicator. If the article-identification-and-location device is not allowed to leave the zone unless someone is known to be currently coming to take the associated item of interest, the article-identification-and-location device enters the "alarm state" (whether by remote command from the private network or by its own internal programming logic). The "alarm state" corresponds to when the article-identification-and-location device has been programmed or instructed to issue an alarm, e.g., to signify a pickup mistake. In this example, the detected change of state is the article-identification-and-location device crossing over the threshold of the zone. This detected change of state can be combined with other detected changes of states, for example, motion detection, to enhance confidence that the article-identification-and-location device is presently involved in a pickup event (whether mistakenly or properly).

As another example, when an article-identification-and-location device enters a zone, it may be programmed (or wirelessly instructed to) enter the "coupled state." Alternatively, the entering of the zone can serve to verify the coupling (i.e., associating) of the article-identification-and-location device to the item of interest.

In some embodiments, the article-identification-and-location device 102 remains with the article (i.e., item of interest) after the customer takes the article home or to its intended destination. The article-identification-and-location device can continue to operate, serving such functions, for example, as assisting the customer find the article at its new location, sending out reminder notifications for servicing the item of interest or for changing a battery (the article-identification-and-location device's battery or item of interest's battery, if it has one).

Figure 3:
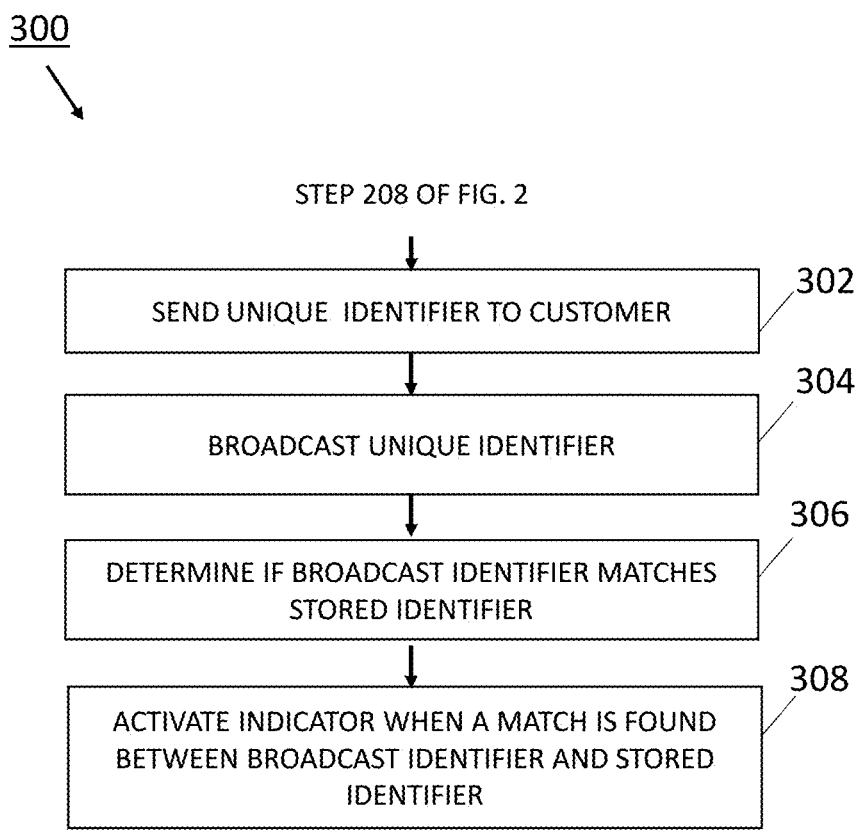
FIG. 3 is a flowchart of an embodiment of another process by which a customer is guided to an item of interest set aside for the customer in a store.

FIG. 3 shows an embodiment of another process 300 by which a customer is guided to an item of interest set aside for the customer in a store. The description of process 300 makes references to various elements of the system 100 shown and described in FIG. 1. To shorten the description, the process 300 takes up after an article-identification-and-location device 102 and its unique identifier 118 have been associated with a customer order, namely, the related customer information and ordered item of interest.

After an article-identification-and-location device 102 is associated with the customer, the customer mobile device receives (step 302) the unique identifier 118 of the article-identification-and-location device 102. The app 128 on the customer's mobile device 110 can acquire the unique identifier in any of various ways. One way is for the user computer device 112 to receive the unique identifier from the website in response to sending the online request to set aside the item of interest 104. The customer is asked to enter this unique identifier into the app 128 that runs on the customer's mobile device.

In a second way, the personnel device 114 or private network 106 can send an electronic communication, for example, an email or a text message, with the unique identifier to the customer computing device 112, or to the customer mobile device 110, requiring the customer to enter the unique identifier into the app 128.

In a third way, the app 128 running on the customer's mobile device 110 receives the unique identifier upon the customer being determined to have entered the store (step 210 of FIG. 2). For example, when the customer is in the store, the RF signals, TCP/IP, or UDP from the customer's mobile device 110 convey customer information to the private network 106, by allowing the customer mobile device connect to the wireless Ethernet network provided by the private network). The app can be looking for this Ethernet network in a background process and connect automatically when the customer mobile device detects a sufficiently strong signal, or the customer can manually initiate the process. Using this customer information, the personnel device 114 or the private network 106 can acquire the unique identifier associated with the customer (specifically, the customer order) and cause the unique identifier to be wirelessly transmitted to the app 128 running on the customer mobile device 110.

As another example, store staff can verbally provide the unique identifier to the customer (e.g., when the customer visits a help desk at the store or telephones the store) and tell the customer to enter the value into the app.

Yet another example, the customer can receive the unique identifier in response to scanning a barcode at a scanning station. The customer then enters the value into the app 128 running on the customer mobile device 110.

While the customer is in the store, the app 128 operates to cause the RF transceiver 126 of the customer mobile device 110 to wirelessly broadcast (step 304) the unique identifier. Each article-identification-and-location device 102 within range to receive the broadcasted unique identifier determines (step 306) whether it matches its own stored unique identifier. The article-identification-and-location device 102 that finds a match between its stored unique identifier and the broadcasted identifier activates (step 308) its indicator(s) 120 to help guide the customer to the set-aside item. For example, the article-identification-and-location device 102 can illuminate its LED, if configured with one, or emit a sound or audio instructions if equipped with a speaker. The LED can flash green, for example, to indicate the correct item of interest for the customer. In addition, the LED may turn on only after the article-identification-and-location device 102 determines the customer has come within a certain distance based on the RF signals coming from the customer's mobile device 110. In the case where the identifier does not match the identifier stored in the article-identification-and-location device 102, the LED can illuminate or flash red, for example, to indicate the associated item is not for the approaching customer.

As an illustration, when the customer takes the hanger with the suit to a dressing room, one or more of the aforementioned sensors of the article-identification-and-location device 102, whether the article-identification-and-location device is attached to the hanger or to the suit, can sense movement. If the article-identification-and-location device is adapted to clasp to the suit itself, like an anti-theft tag, should the customer remove the suit from the hanger and leave the hanger behind, the article-identification-and-location device can detect further movement of the suit, and the location of the suit can be tracked throughout the store based on the RF signals emitted by the article-identification-and-location device (provided the article-identification-and-location device is configured with an RF transmitter).

To illustrate by another example, an article-identification-and-location device 102 may be placed on top of a clothes pile set aside for a given customer, and when the customer comes in to the store premises or to designated pickup area, and identifies him or herself using customer information, the article-identification-and-location device on the clothes illuminates the LED (or emits an alarm). Also, bags can be used to hold items of interest and be hung from hooks or pegs, and the article-identification-and-location devices can be adapted to be hung on the hooks or pegs atop the bags. When the article-identification-and-location device, associated with a given bag hanging from a peg, wirelessly receives an unique identifier that matches its stored unique identifier, the article-identification-and-location device can illuminate its LED to signal which bag the approaching customer should take.

Similar to that described in connection with the process 200 in FIG. 2, the customer mobile device 110, the private network 106, or both can serve as additional guides to home in on the item of interest; the customer's mobile device 110 can use RSSI measurements or timing measurements based on the RF signals transmitted by the article-identification-and-location device 102 (configured in this instance with an RF transmitter); the private network 106 can use signal strength or angle of arrival measurements based on RF signals received by the multiple RF transceivers 124 (at different locations) to navigate the customer to the article-identification-and-location device 102. Further, the customer validation techniques described in connection with the process 200 of FIG. 2, using one or more sensors to sense a change of state of the article-identification-and-location device 102, may be employed to ensure a given customer has taken the correct item of interest.

Figure 4:
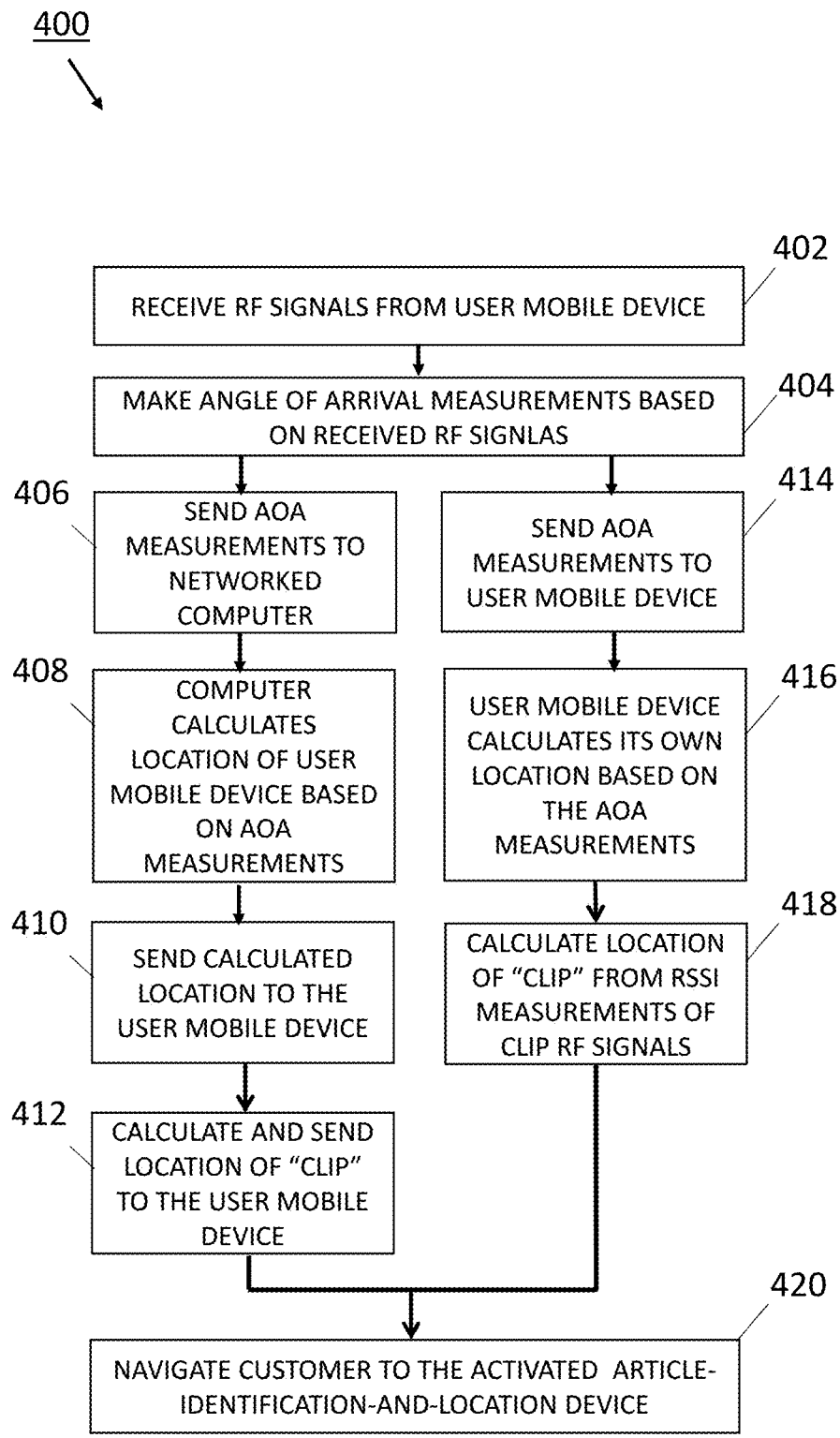
FIG. 4 is a flowchart of an embodiment of a process for guiding a customer (or personnel) to an activated article-identification-and-location device.

FIG. 4 shows an embodiment of a process 400 for guiding the customer to an activated article-identification-and-location device 102. This description of process 400 makes references to various elements of the system 100 shown and described in FIG. 1. During the process 400, the customer is on the store premises, with their customer mobile device 110, and is executing the app 128. Also, the activated article-identification-and-location device 102 comprises an RF transmitter that is sending RF signals continuously (because of the article-identification-and-location device's activation) or periodically. At step 402, the RF transceivers 124 (e.g., beacons) on the private network 106 communicate with the customer's mobile device 110, receiving RF signals therefrom generated by the app 128 running on the customer's mobile device 110. The RF transceivers 124 make (step 404) angle of arrival (AoA) measurements based on the RF signals transmitted by the customer's mobile device 110. In one embodiment, these AoA measurements pass (step 406) to the computing system 122 on the private network 106; from these AoA measurements the computing system 122 calculates (step 408) the location of the customer's mobile device 110. The private network 106 sends (step 410) this location to the customer's mobile device 110. In addition, the network of RF transceivers 124 can determine (step 412) the location of the article-identification-and-location device 102 from the RF signals transmitted by the article-identification-and-location device and sends this location of the article-identification-and-location device to the customer's mobile device 110. Rather than using AoA measurements, the private network 106 can alternatively determine the locations of the customer's mobile device 110 and the article-identification-and-location device 102 based on RSSI measurements or timing measurements.

Instead of calculating the location of the customer's mobile device 110, the RF transceivers 124 can send (step 414) the AoA measurements to the customer mobile device 110, and the customer mobile device calculates (step 416) its own location based on those AoA measurements. Further, instead of relying on the private network 106 to provide the location of the activated article-identification-and-location device 102, the customer mobile device 110 makes (step 418) this location determination. The app 128 running on the customer mobile device uses the strength of the RF signals from the article-identification-and-location device 102 to home in on the article-identification-and-location device's location. Alternatively, the app 128 can use timing measurements (e.g., extracted from the article-identification-and-location device's ultrawideband signals) to determine proximity to and, ultimately, to be led to the article-identification-and-location device's location.

Using the calculated location of the customer mobile device 110, whether received from the private network or calculated on its own, the app 128 executing on the customer mobile device can navigate (step 420) the customer to the location of the article-identification-and-location device 102. For example, the app 128 running on the customer mobile device 110 can display two points on a graphical floor plan of the store, one representing the customer's current location, and the other representing the location of the article-identification-and-location device. An operating indicator 120, such as an illuminated LED or speaker, on the article-identification-and-location device can assist and complete the navigation once the customer comes into visible or audible range.

For any or all processes 200, 300, 400 described in connection with FIG. 2, FIG. 3, and FIG. 4, there are certain situations in which store personnel, rather than the customer, search for the set-aside item of interest 104. For example, a customer arrives at a store, and the desired article is behind a counter where the customer cannot go. Such situations appear commonly in full-service laundromats or coat-check rooms. Accordingly, the customer needs the assistance of store personnel to obtain the article.

Notification of personnel to act on behalf of the customer can occur in a variety of ways. For instance, upon the customer arriving at the store, the app 128 running on the customer mobile device 110 can communicate with the store's the private network 106, and the private network can notify the personnel device 114 of the customer's arrival. As another example, the customer mobile device 110 can communicate with the article-identification-and-location device 102 coupled with the desired item of interest, and this article-identification-and-location device can notify store personnel (e.g., by illuminating the LED, making a pre-defined sound).

The store personnel then assume the role of finding and acquiring the article for the customer. To do so, the app running on the personnel device 114 may need to acquire the unique identifier for which the article-identification-and-location device 102 coupled to the item of interest listens. Store personnel can acquire this unique identifier in various ways: the store personnel device 114 can "pair" with the customer's mobile device 110, for example, establishing a Bluetooth® connection between the two devices 110, 114; the customer mobile device 110 can send customer information to the store's private network 106, and the store's private network 106 can forward the unique identifier associated with this customer information to the store personnel device 114; the store personnel device 114 may already possess the unique identifier from the moment when the store personnel associated the article-identification-and-location device 102 with the customer (e.g., in response to the customer's request to lay aside the article); or the store personnel device 114 can acquire the unique identifier by communicating with the article-identification-and-location device that is illuminating the LED or making a predefined sound because the article-identification-and-location device has received the correct unique identifier from the customer mobile device 110. When in possession of this unique identifier, the store personnel device 114 wirelessly transmits it, and the article-identification-and-location device 102 illuminates (or continues to illuminate) its LED in response to receiving the unique identifier; the store personnel can thus obtain the article for the customer. Alternatively, the personnel device communicates with the private network 106 to forward the request to the specific article-identification-and-location device.

Figure 5:
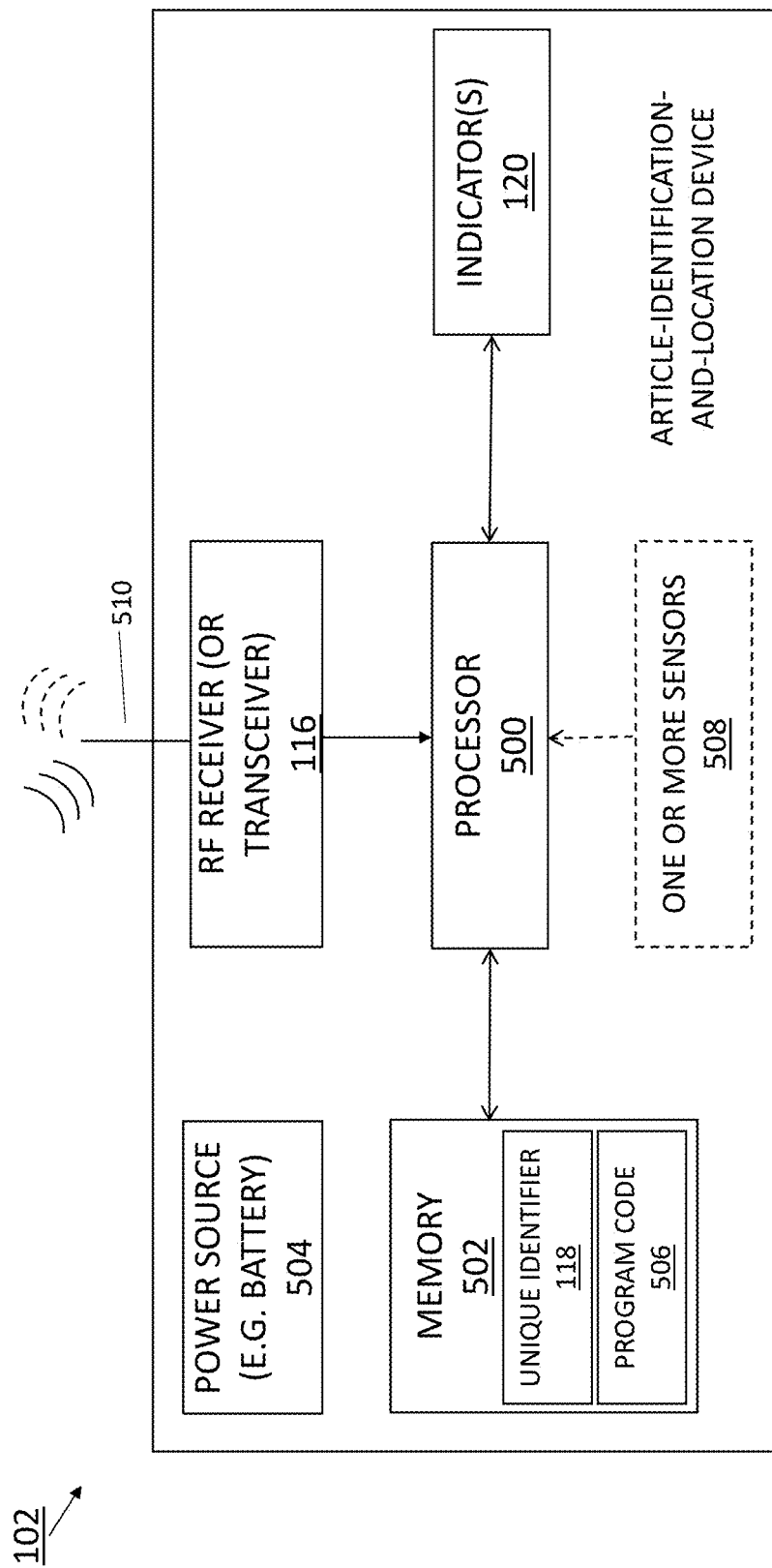
FIG. 5 is a block diagram of an embodiment of an article-identification-and-location device used to facilitate the locating of articles or items of interest within a store, for example.

FIG. 5 shows a functional block diagram of an embodiment of the article-identification-and-location device 102 used to facilitate the locating of articles or items of interest within a building of an establishment, business, or organization. The article-identification-and-location device 102 includes a processor or processing unit 500, memory 502, an RF receiver 116 (or, in another embodiment, an RF transceiver), one or more indicators 120, and a power source 504. The memory 502 stores the unique identifier 118 (as described previously) and program code 506, which, when executed, controls the various functionalities of the article-identification-and-location device 102 as described herein. The memory 502 and the information and program code it stores can be physically distributed among the various components of the article-identification-and-location device 102. For example, the RF receiver (or RF transceiver) can store the unique identifier, and memory storing the program code 506 can be part of the processor 500. Optionally, the article-identification-and-location device 102 includes one or more sensors 508 (shown in phantom).

The processor or processing unit 500 is electronic circuitry adapted to execute the instructions of the program code 506 that controls the operation of the article-identification-and-location device 102, for example, the processing of RF signals received by the RF receiver 116 to retrieve therefrom a unique identifier, the comparing of the received unique identifier with the unique identifier stored in the memory 502, and the activation of the indicator(s) 120 when such unique identifiers match.

The RF receiver 116 has, in one embodiment, an antenna 510 for receiving radio signals. As previously described, the RF receiver 116 operates in accordance with a wireless communication technology, examples of which include, but are not limited to Bluetooth®, Bluetooth Low Energy (BLE), 802.XX, WLAN and ultra-wideband (UWB), and in one embodiment, may be part of an RF transceiver.

The one or more indicators 120 include one or more light-emitting diodes (LEDs), a speaker, or both. The one or more LEDs may be embodied as a strip of LEDs. The speaker may be configured to emit continuous or periodic sounds at different volumes and frequencies, each sound designed to convey a specific connotation, such as an alarm, warning, or success, and ranging beeps. A lighting sequence or series of sounds can vary from slow to fast, depending on the effect desired.

Embodiments of the one or more sensors 508 include, but are not limited to, an inertial sensor, a contact sensor, an angular Hall sensor, a temperature sensor, a humidity sensor, and/or other sensors for detecting environmental conditions to which the sensor is exposed, or any combination thereof. In some embodiments, the one or more sensors 508 are adapted to detect the movement of the article-identification-and-location device 102. In some embodiments, the one or more sensors 508 can also determine the angle at which the article-identification-and-location device 102 is tilted with respect to the Earth. In some embodiments, the one or more sensors 508 includes an inertial sensor constructed and arranged to permit the article-identification-and-location device 102 to self-track, for example, by providing a 9-axis sensing feature comprising a combination of a 3-axis gyroscope, a 3-axis accelerometer, and a 3-axis compass, magnetometer, or the like. Self-tracking of the article-identification-and-location device 102 can therefore occur in a self-contained manner (i.e., locally, at the device) due to the motion, vibration, and/or inclination data provided by the sensor(s) 508 to the processor 500 or other electronic components of the device 102, and/or electronically communicate via an I/O device with a remote computer to exchange data to assist with a self-tracking operation. For those embodiments of article-identification-and-location device 102 that are two-prong clips, the contact sensor is a device adapted to determine whether clip is open or closed (as used herein, the opening or closing of the clip is a type of detectable movement of the clip). The angular Hall sensor is a device adapted to measure an angular position of one clip prong relative to the other clip prong and is used to determine if the clip is open or closed, or if the clip is open when it should not be. The temperature sensor is a device adapted to produce a temperature measurement of the article-identification-and-location device's environment. The humidity sensor is a device adapted to measure humidity in the article-identification-and-location device's environment. In general, the temperature and humidity sensors serve to monitor the environment of the item of interest. Measurements provided by such sensors can contribute to locating an item if interest; for example, a low temperature measurement can suggest the item of interest is being refrigerated. In addition, a sensor with a capacitive sensing ability can be used to sense touch. This ability can be applied to a specific area of the article-identification-and-location device, in effect, providing means by which a user can interact with the device in lieu of a button.

The power source 504 is, in one embodiment, a battery. The battery may be unremovable or removable, wired or wirelessly rechargeable (whether unremovable or removable), replaceable (whether non-rechargeable or rechargeable), or neither replaceable nor rechargeable, in which instance the article-identification-and-location devices 102 is disposable after the battery has discharged. In one embodiment, the article-identification-and-location device 102 may operate predominantly in sleep mode to extend the battery life, on a duty cycle for receiving and transmitting (when so configured), awakening periodically to listen for the unique identifier that causes the article-identification-and-location device 102 to perform an action and to transmit its unique identifier (also, when so configured). Other techniques may be used to minimize battery consumption.

Figure 6:
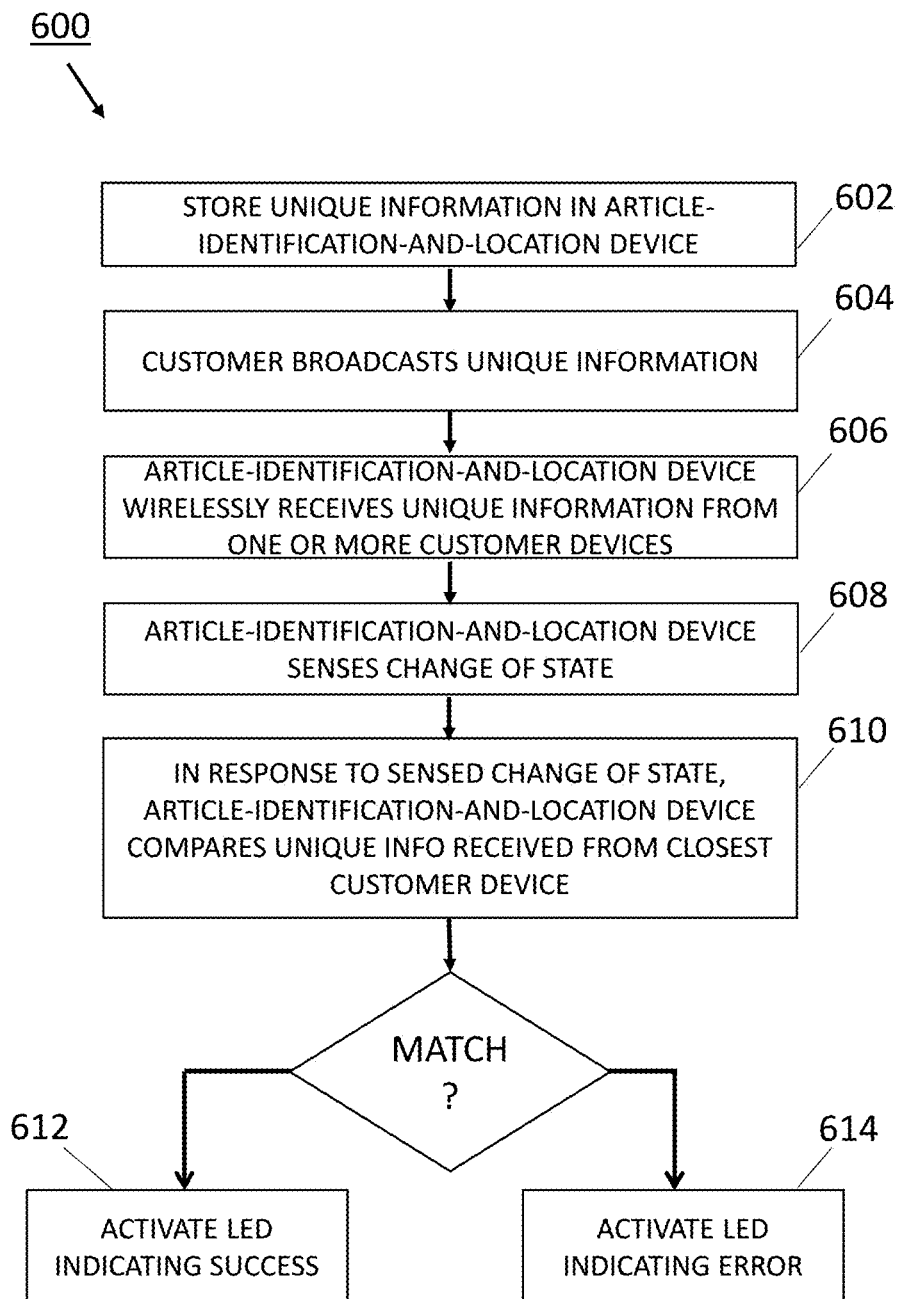
FIG. 6 is a flowchart of an embodiment of a process for validating whether the correct customer has picked up a given item of interest.

FIG. 6 shows an embodiment of a process 600 for validating whether the correct customer has picked up a given item of interest. The process 600 presumes the article-identification-and-location device 102 experiences a change of state when the item is picked up (for example, the article-identification-and-location device is permanently or temporarily attached to the item of interest and moves or is touched when the item is taken).

At step 602, unique information is stored in the article-identification-and-location device 102. This unique information can be any unique information that is possessed by both the article-identification-and-location device 102 and the customer who is to pick up the item associated with this article-identification-and-location device. Examples of such unique information include, but are not limited to, the unique identifier, product information, customer information, or customer identification.

The customer mobile device 110 broadcasts (step 604) the unique information. The article-identification-and-location device 102 wirelessly receives (step 606) the unique information from one or more customer mobile devices 110.

At step 608, the article-identification-and-location device 102 senses a change of state (e.g., motion, temperature change, angular change, opening of the clip). In response to the sensed change of state, the article-identification-and-location device 102 compares (step 610) the unique information received from the customer mobile device 110. If unique information comes from more than one customer mobile device 110, the article-identification-and-location device 102 determines the closer (or closest) customer device 110 and uses the unique information from that device 110 in the comparison.

Upon determining matching unique information (step 612), the article-identification-and-location device 102 may illuminate an LED or emit a sound connoting success. Upon detecting a mismatch (step 614), the article-identification-and-location device 102 may flash an LED or emit an alarm connoting an error has occurred. Alternatively, the article-identification-and-location device can broadcast the sensed change of state and other information related to the signals received from customer device 110, and from this information the computing system 122 on the private network 106 determines whether the article-identification-and-location device should alarm. If the article-identification-and-location device does not receive an RF signal telling the article-identification-and-location device it has approval to be removed or moved (for example, it is unclipped from the item of interest), the article-identification-and-location device alarms. If, instead, the article-identification-and-location device approval for the change of state, the device does not alarm.

In this alternative embodiment, the article-identification-and-location device has a general "active" state, which is, for example, to start flashing white LED whenever the article-identification-and-location device is moved around. If the article-identification-and-location device is part of a current order pickup, it is instructed to set to "Indicate" state, that enables the customer to identify it. In response to the sensed change of state, the article-identification-and-location device starts broadcasting its changes. At the computing system 122, the computing system 122 on the private network listens to the article-identification-and-location device broadcasts, and if it does not have any information regarding a customer pickup, it communicates with the server to inquire of any such pickup. If there is no pickup, or the pickup does not tie into unique identifier of this broadcasting article-identification-and-location device, the computing system 122 on the private network instructs the article-identification-and-location device to alarm, setting the article-identification-and-location device to an "incorrect" state.

Another way for this outcome to occur is for the article-identification-and-location device to alarm if the article-identification-and-location device is currently in the "coupled" state and transitions to "Active" state without ever having been set to "indicate" state. The article-identification-and-location device still broadcasts its data to the computing system 122 and the computing system 122 can decide what occurs next.

The article-identification-and-location device 102 may be configured to transmit a message to the private network 106 reporting success or error. The private network 106 can record the transaction involving the item, such as success or error, time of the event, and, in the instance of the error, notify personnel (via the personnel device 114), who might then be able to find the customer within the store and remedy the situation. RF signals transmitted by the article-identification-and-location device 102, provided the article-identification-and-location device 102 is still attached to or part of the item, may potentially serve to guide personnel to the customer.

Figure 7:
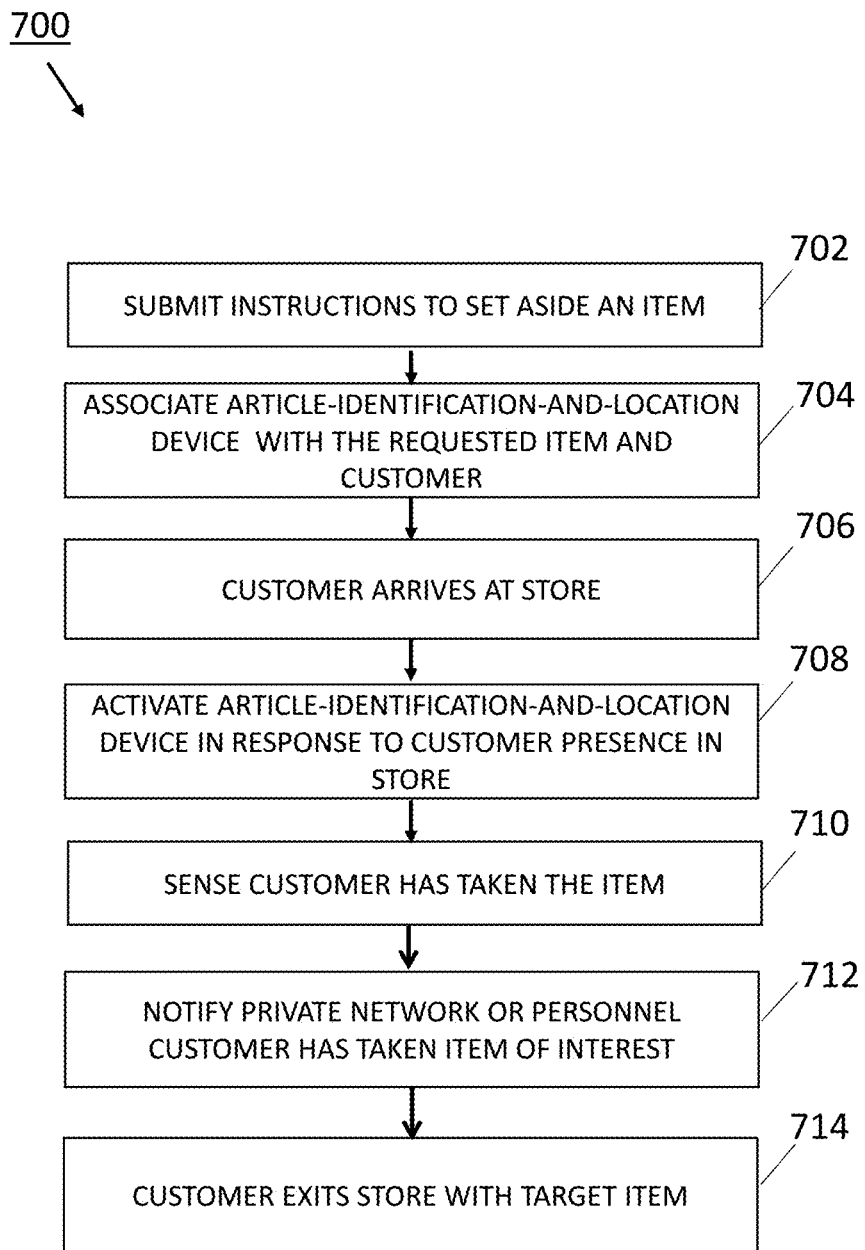
FIG. 7 is a flowchart of an embodiment of a process of self-service, contactless pick-up of an item of interest from a store.

FIG. 7 shows an embodiment of a process 700 for self-service, contactless pick-up of an item of interest from a store. Contactless, as used herein, means no face-to-face interaction between a customer and store personnel when the customer comes to pick up the item from the store. At step 702, the customer remotely communicates with a store and requests an item for purchase.

In response to the request, the system 100 (FIG. 1) assigns (step 704) an article-identification-and-location device 102 (having a unique identifier) to the item of interest and to the customer; the assigned article-identification-and-location device 102 is physically with the item of interest and the customer possesses the unique identifier (or other unique information) that enables the article-identification-and-location device 102 to validate the customer at the moment of item pick-up.

The customer (or person with the unique identifier) arrives (step 706) at the store. In response to the customer's presence in the store, the article-identification-and-location device 102 activates (step 708) its indicator, drawing the attention of the customer to itself and thus to the item of interest. For example, the article-identification-and-location device can turn on a light or produce a pattern of lighting, emit a sound or a pattern of sounds, to distinguish itself from other active article-identification-and-location devices. As previously described, the customer's presence can be detecting in a variety of ways, for example, the customer scans in a barcode at a scanning station in the store, or the private network 106 communicates with the app 128 running on the customer mobile device 110, the customer mobile device comes within proximity, or the customer pushes a button on the customer mobile device.

The article-identification-and-location device 102 senses (step 710) the customer has taken the item (e.g., movement detection, clip opens) and notifies (step 712) the private network 106 and/or the personnel device 114.

The customer leaves (step 714) the store with the item, not having had to interact in person with store personnel to acquire the item. Though the system 100 knows of and records the customer's coming into the store and departure with the item, no one member of staff personnel needs to have been aware of the event. Safeguards may be in place to ensure the customer does not walk away with the wrong item. From the customer's perspective, the customer has not interacted directly with a single individual, from the placement of the order to the item acquisition. The customer pick-up of the item is thus self-service.

Figure 8:
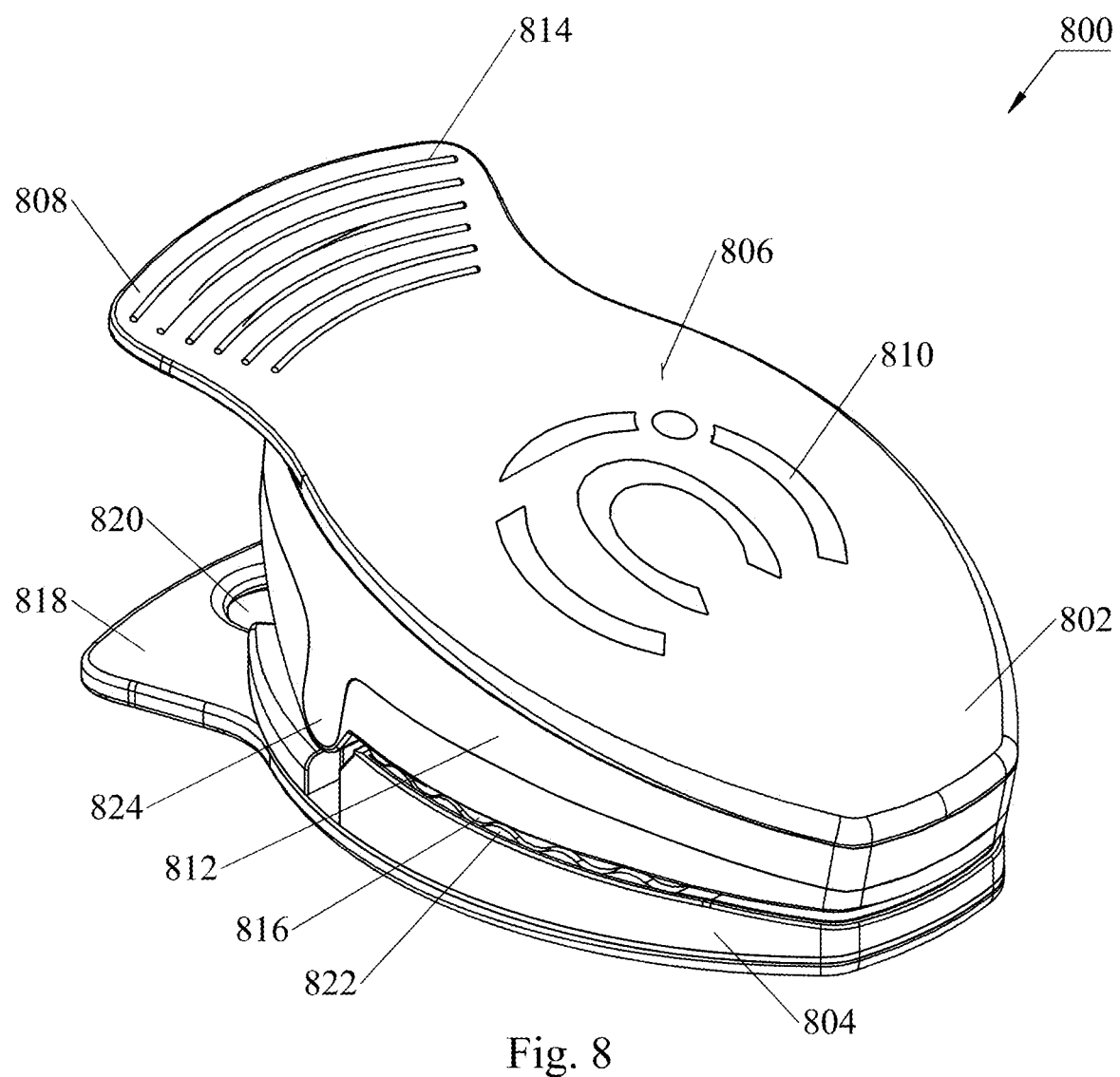
FIG. 8 is an isometric view of an embodiment of an article-identification-and-location device exemplified as a clip, here shown in a closed position.

FIG. 8 shows an embodiment of an article-identification-and-location device 102 in the form of a clip 800, shown here in a closed position. The size of the clip 800 can vary, depending upon its use. For example, in one embodiment, the clip is about one and three-quarter inches in width, two and three-quarter inches long, and one and one-quarter inches in thickness.

In this embodiment the clip 800 has a body comprised of two portions or pincers: an upper portion 802 and a base portion 804. In general, the pair of pincers are joined at a pivot and operate in opposition to grasp an article. A spring at the clip's pivot (not shown) urges the two portions 802, 804 of the clip 800 into the closed position. Other embodiments can have other mechanisms for joining the pair of pincers at the pivot, for example, a hinge, and use other mechanisms for keeping the clip closed, for example, a mechanical or magnetic latch.

The upper portion 802 of the clip houses the various components of the article-identification-and-location device 102 described in FIG. 5, including the RF receiver (or transceiver), the processor, the memory, the power source, the indicator(s), and the one or more sensors. The body of the upper portion 802 is slightly concave and generally oval with a fishtail-shaped planar extension 808. An outer surface 806 of the upper portion 802 has a translucent logo or pattern 810 through which light from an internal LED can shine. The sides 812 of the upper portion 802 can also be translucent for purposes of allowing internal LED illumination to shine through. A plurality of arcuate ridges 814 on the outer surface of the planar extension 808 provide a tactile region for a user to place his or her finger when pinching the clip open. The underside or interior surface of the upper portion 802 (i.e., within the mouth of the clip) has a plurality of ribs 816 (only the ends of which are visible in FIG. 8). The ribs 816 extend the width of the upper portion 802 of the clip 800.

The base portion 804 of the clip 800 has a substantially oval shape similar to that of the upper portion 802 and includes a planar extension 818 that is spatially separated from and opposes the planar extension 808 of the upper portion 802. The planar extension 818 has a hole 820 therein sized to hang the clip from a hook or peg, for example. An interior side of the base portion 804 (within the mouth of the clip) has a plurality of ribs 822. An exterior side of the base portion 804 is planar so the clip 800 can sit flat on a flat surface. The location of the ribs 822 are offset from those ribs 816 of the upper portion 802 so that the sets of ribs 816, 822 interleave when the clip 800 is closed. The ribs 816, 822 provide a tactile region that improves surface contact with materials to which the clip 800 is attached. The ribs 822 extend the width of the base portion 804 of the clip 800.

To open the clip 800, a user places his or her fingers on the outer surfaces of the planar extensions 808, 818 and with sufficient force pinches the planar extensions toward each other to open the mouth of the clip. The upper portion 802 pivots about the axis 824 of the spring. Although the described embodiment of the clip has the upper and base portions 802, 804 joined at the pivot, it is to be understood that other clip embodiments can have the upper and base portions 802, 804 constructed as a unitary piece or as separable pieces joined elsewhere other than at the pivot point.

Figure 9:
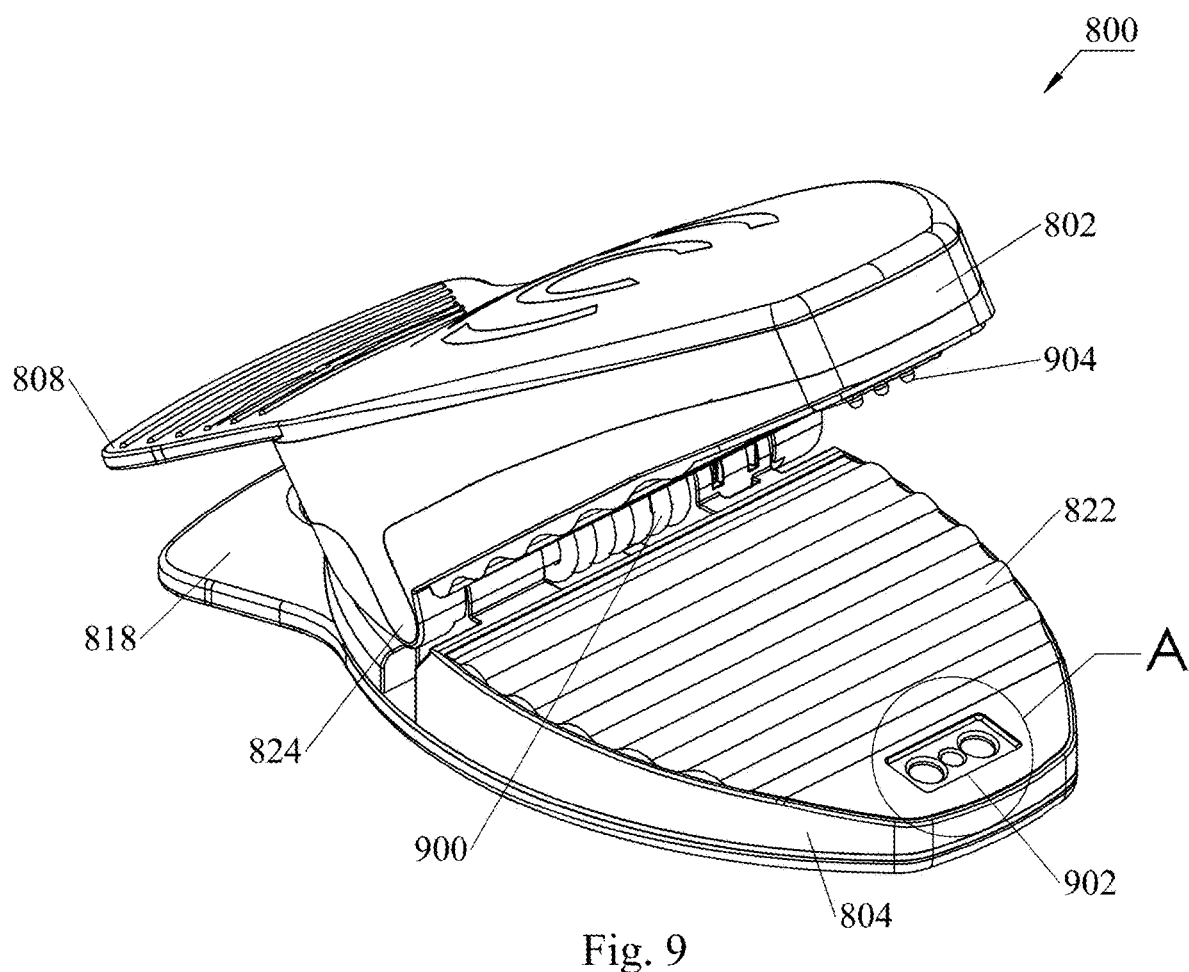
FIG. 9 is an isometric view of the clip of FIG. 8 in an open position.

FIG. 9 shows of the clip 800 of FIG. 8 in an open position, with the extensions 808, 818 pinched towards each other. The clip 800 has a spring 900 along the pivot axis 824. When in the open position as shown, the clip 800 is in tension, with the spring 900 urging the upper portion 802 and base portion 804 to close. On the interior side of the base portion 804 are the ribs 822 and a recessed contact pad region 902. This embodiment of the clip 800 includes a contact sensor system (housed within), and the contact sensor system uses the contact pad region 902 and a pogo pin assembly 904, comprised of three pogo pins, disposed on the interior side of the upper portion 802. The location of the pogo pin assembly 904 on the upper portion 802 is opposite that of the location of the contact pad region 902 on the base portion 804 such that the pogo pin assembly 904 mates with the contact pad region 902 when the clip is in the closed position.

Figure 10:
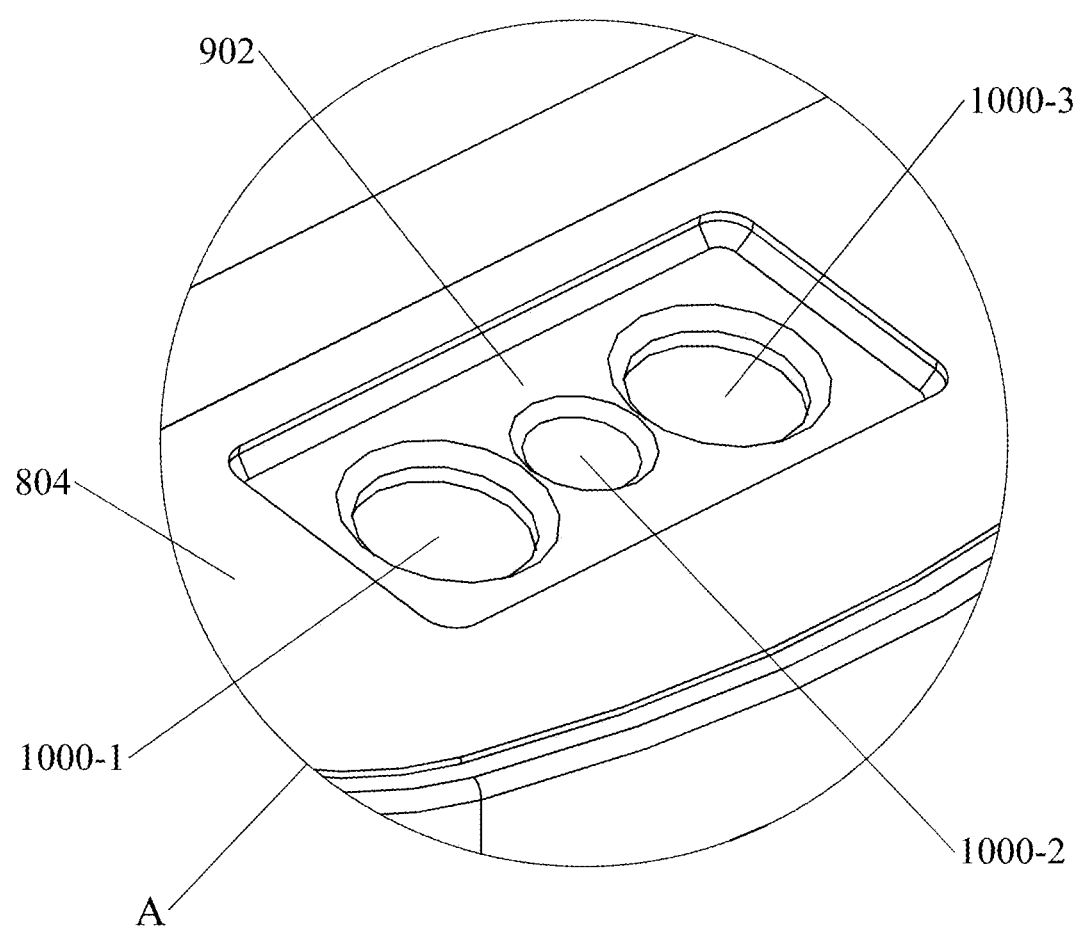
FIG. 10 is a detail view of a contact sensor contact pad region recessed in a base portion of the clip of FIG. 9.

FIG. 10 shows a detail view of an embodiment of the contact sensor contact pad region 902 within the circle A shown in FIG. 9. The contact pad region 902, recessed in the interior side of the base portion 804 of the clip, includes three circular openings 1000-1, 1000-2, 1000-3 (generally, 1000) aligned in a row adjacent each other. In one embodiment, the center opening 1000-2 has a smaller diameter than the diameter of the other two openings 1000-1, 1000-3; the other two openings 1000-1, 1000-3 are equal in size. The opening 1000-2 does not open down to the contact pad and is unused by the contact sensor system. The openings 1000-1, 1000-3 expose the same electrically conductive contact pad at the opening bottoms and are used by the contact sensor system to determine whether the clip is open, closed, or closed on something (the clip may be closed on something too thin for the angular Hall sensor to detect because of its resolution (hence, to the angular Hall sensor, the clip is closed), but the contact sensor would detect an open clip because the thin item between the upper and base portions would break the electrical connection and, thus, indicate an open clip; the combination of the results from the Hall sensor and the contact sensor leads a processor, which receives this data, to conclude that the clip must be closed on something thin or small).

Figure 11:
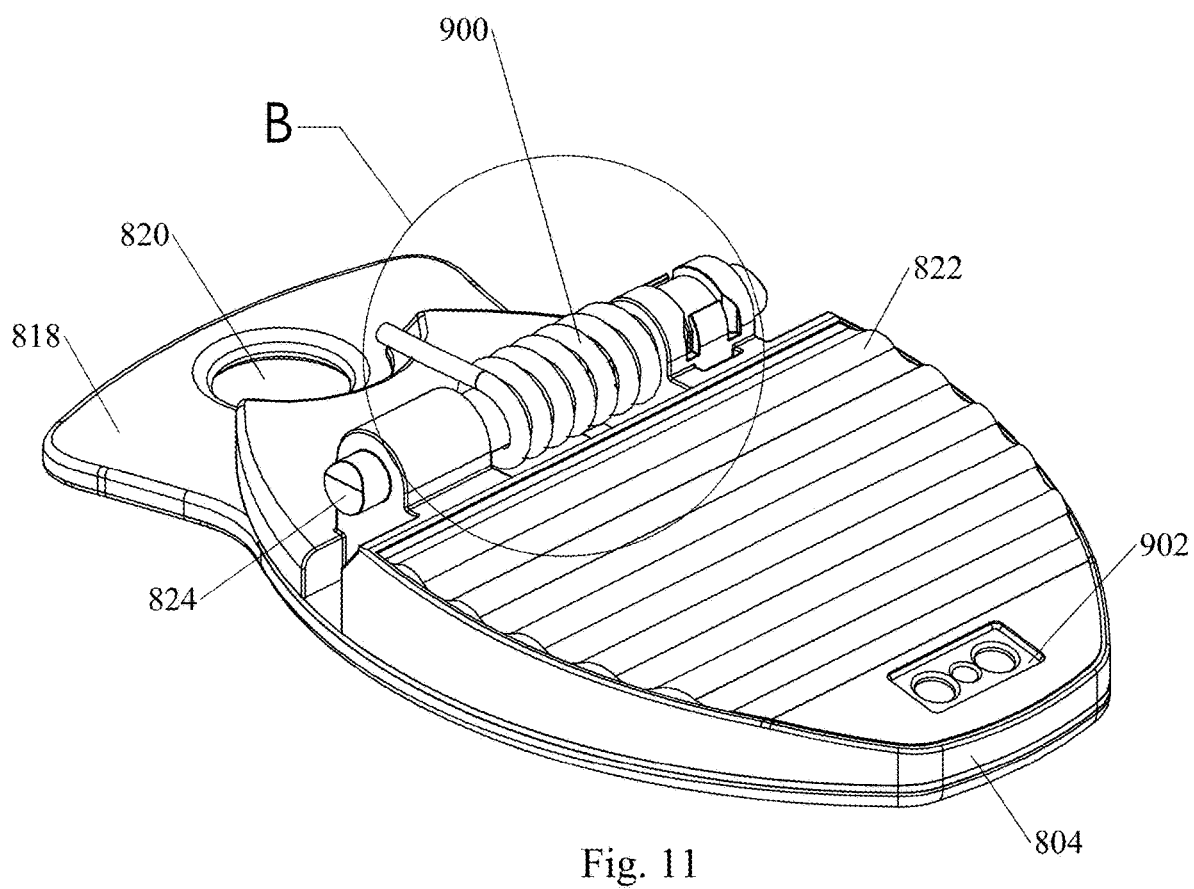
FIG. 11 is a detail view of the base portion of the clip having a rear planar extension with a hole used to hang the clip from hooks or pegs, for example.

FIG. 11 shows the base portion 804 of the clip, with the upper portion of the clip absent to more clearly show the spring 900 affixed to the base portion, the rear planar extension 818 with the hole 820 used to hang the clip from hooks or pegs, the ribs 822 on the interior side, and the contact sensor contact pad region 902. Circle B surrounds a region of the spring 900.

Figure 12:
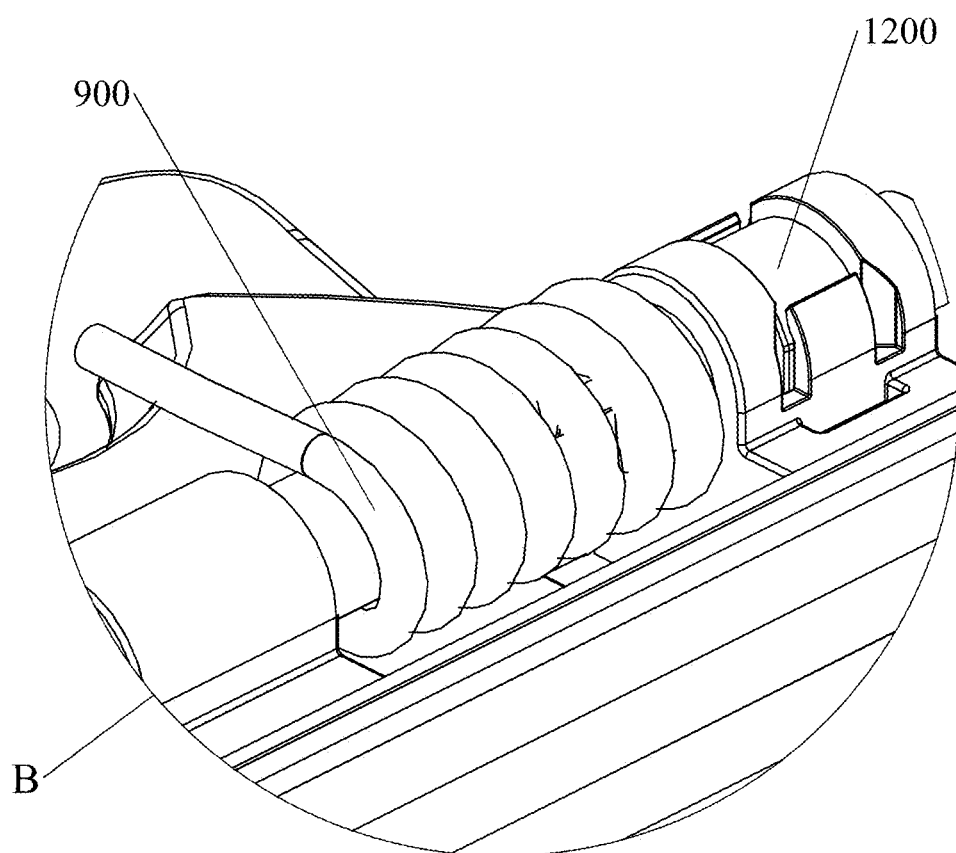
FIG. 12 is a detail view of a spring and a magnet installed in the base portion of the clip.

FIG. 12 show a detail view of features within circle B in FIG. 11; the features include the spring 900 and a magnet 1200. In one embodiment, the magnet 1200 is generally cylindrical with an axial hole through its center and two flat sections on opposite exterior sides of the cylinder. The magnet 1200 is part of the Hall sensor system, which operates by sensing the rotation of the magnetic field. The magnet 1200 is pressed into the base portion 804 (FIG. 8) of the clip 800.

Figure 13:
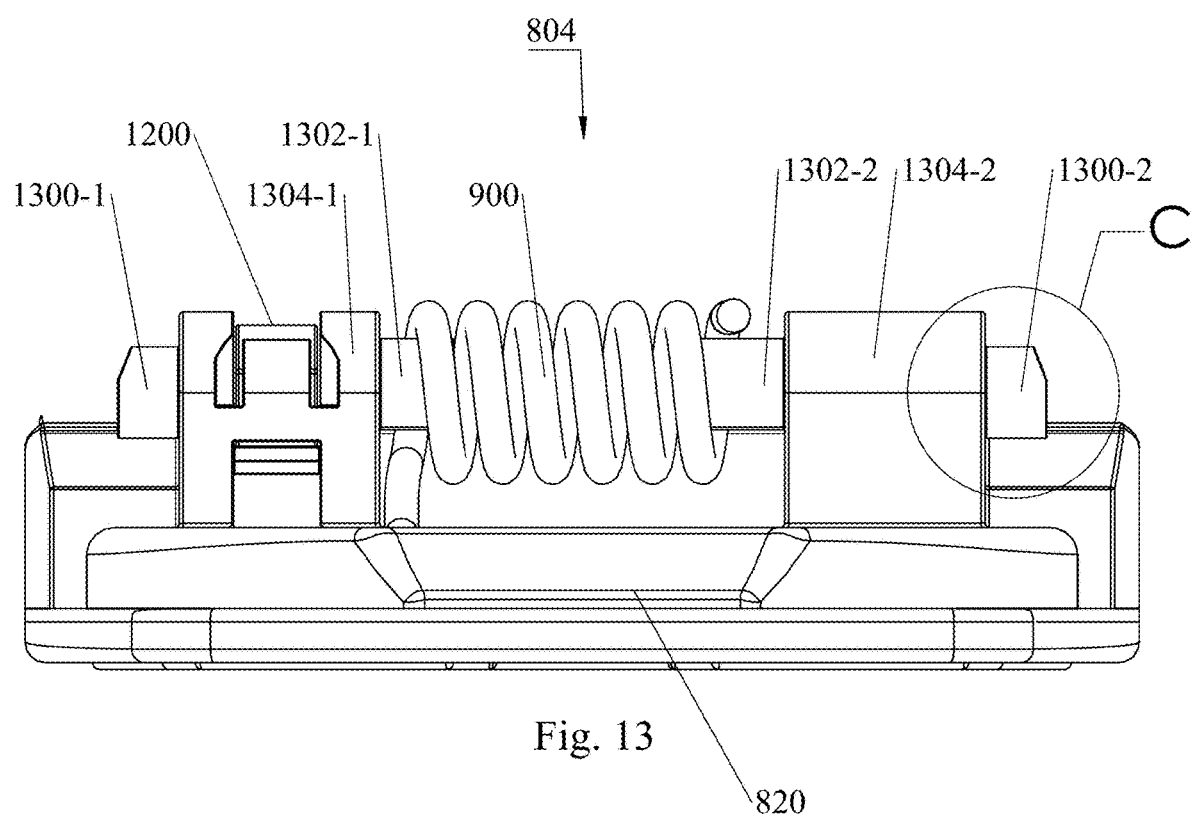
FIG. 13 is a rear view of the base portion of the clip.

FIG. 13 shows a rear view of the base portion 804 of the clip, including the spring 900, magnet 1200, a pair of pivot bosses 1300-1, 1300-2 on opposite sides of the base portion 804, a pair of spring bosses 1302-1, 1302-2 (generally 1302), one on each side of the spring 900, and plastic bosses 1304-1, 1304-2 (generally, 1304). There is one spring boss 1302 and one boss 1304 on each side of the spring 900. From opposite ends of the spring 900, each spring boss 1302 enters the hole in the center of the spring (along the spring's axis). Plastic snap hooks of the boss 1304-1 hold the magnet 1200 in place. The two flat sections on the opposite sides of the magnet cylindrical exterior abut opposing sidewalls of the boss 1304-1, which keeps the magnet from rotating when the clip opens and closes. When the upper portion 802 moves (relative to the base portion 804) the angular Hall sensor system on a circuit board within the upper portion 802 senses a change in the magnetic field (the magnet 1200 remaining fixed in the base portion 804). The hole 820 is in the foreground of the spring 900. Detail circle C surrounds pivot boss 1300-2.

Figure 14:
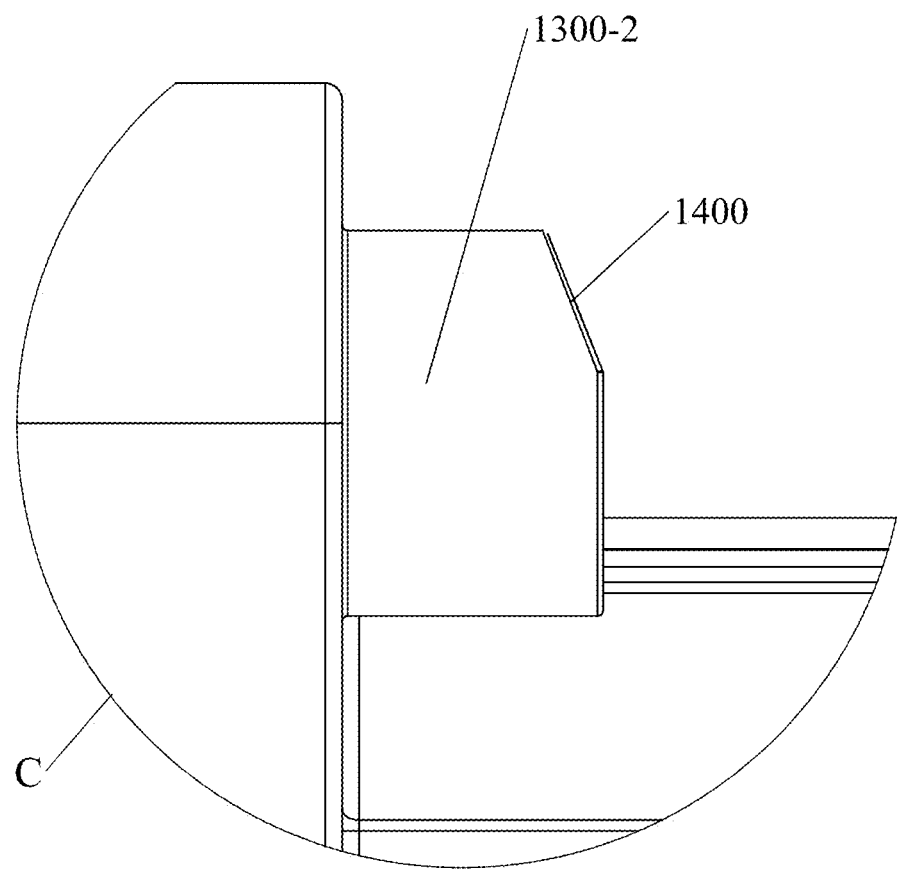
FIG. 14 is a detail view of tapers on a pivot boss, allowing the upper portion of the clip to snap into position.

FIG. 14 shows the pivot boss 1300-2 within the detail circle C of FIG. 13. The pivot boss 1300-2 has a taper 1400, which allows the upper portion 802 of the clip to snap into position onto the base portion 804 when assembling the clip 800.

Figure 15:
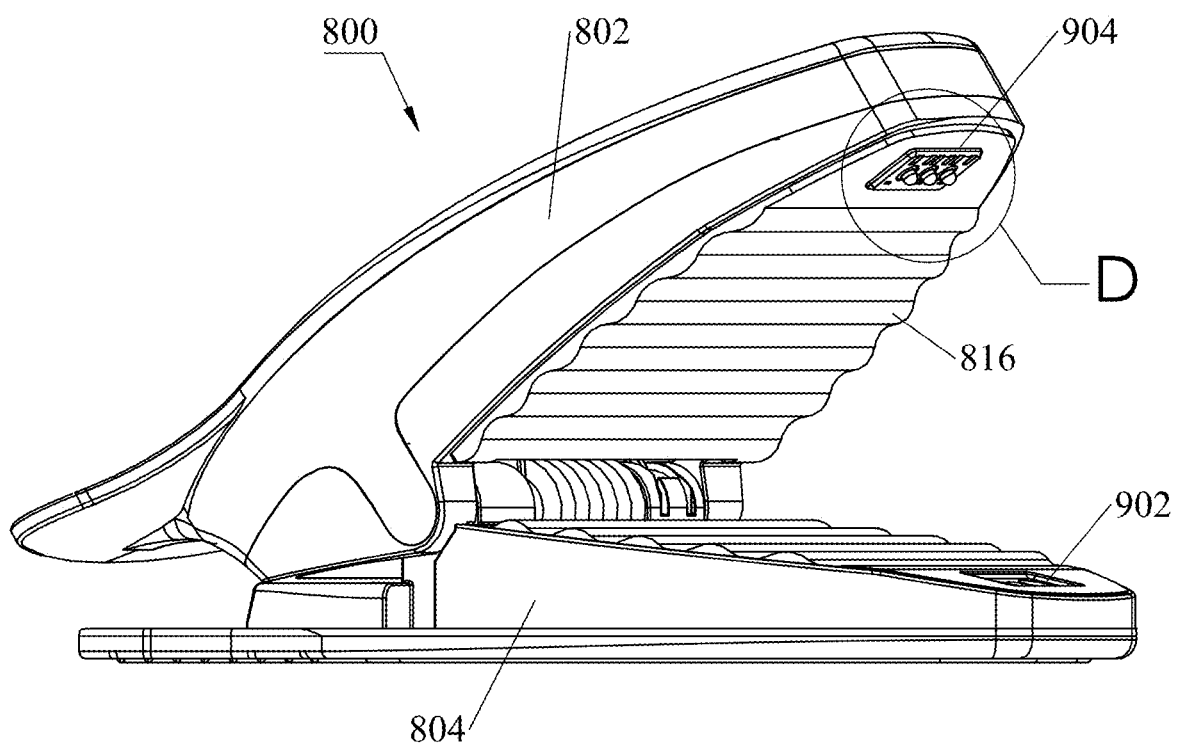
FIG. 15 is a side view of the clip with a circle drawn around a pogo pin assembly used by the contact sensor.

FIG. 15 shows a side view of the clip 800 with a circle D drawn around the pogo pin assembly 904 which is part of the contact sensor system. The contact sensor system determines whether the clip is open or closed based on whether the pogo pin assembly 904 is in electrical contact with the contact pad region 902. Contact between the pogo pin assembly 904 and the contact pad region 902 indicates a closed clip. The contact pad region 902 and pogo pin assembly 904 are disposed near the tip or rounded end of their respective portion of the clip.

Figure 16:
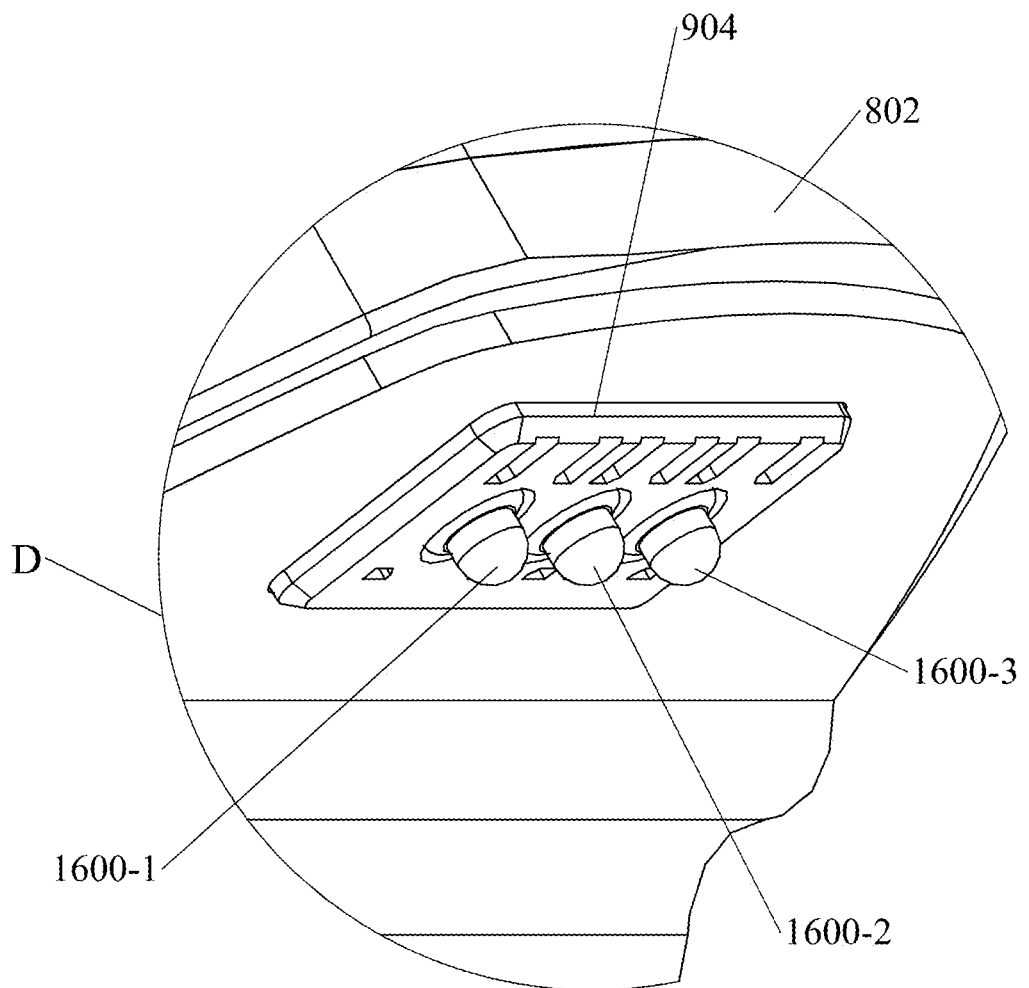
FIG. 16 is a detail view of the pogo pins of the pogo pin assembly of FIG. 15.

FIG. 16 shows a detail view of the three pogo pins 1600-1, 1600-2, 1600-3 (generally, 1600) of the pogo pin assembly 904 within circle D of FIG. 15. Each pogo pin 1600 is spring-loaded and depresses inwards upon contacting a respective opening 1000 (FIG. 10); pin 1600-1 enters opening 1000-1, pin 1600-2 enters opening 1000-2, and pin 1600-3 enters opening 1000-3. The two outer pogo pins 1600-1, 1600-3 contact the same contact pad below the respective openings 1000-1, 1000-3. The contact sensor system (not fully shown) determines the clip is closed when pogo pins 1600-1 and 1600-3 come into electrical contact with the contact pad at the bottom of the openings 1000-1 and 1000-3, respectively, completing the electrical connection. The center pogo pin 1600-2 does not come into electrical contact with this contact pad when the clip is closed but contacts a depression in the plastic in the center opening 1000-2. During charging of the battery, the center pogo pin 1600-2 is used as the positive (+) terminal and the pogo pin 1600-3 is used as ground. The center pogo pin 1600-2 can also be used to sense when the clip is closed on a conductive item by establishing a connection with the other pogo pins 1600-1, 1600-3, while typically it would not.

Figure 17:
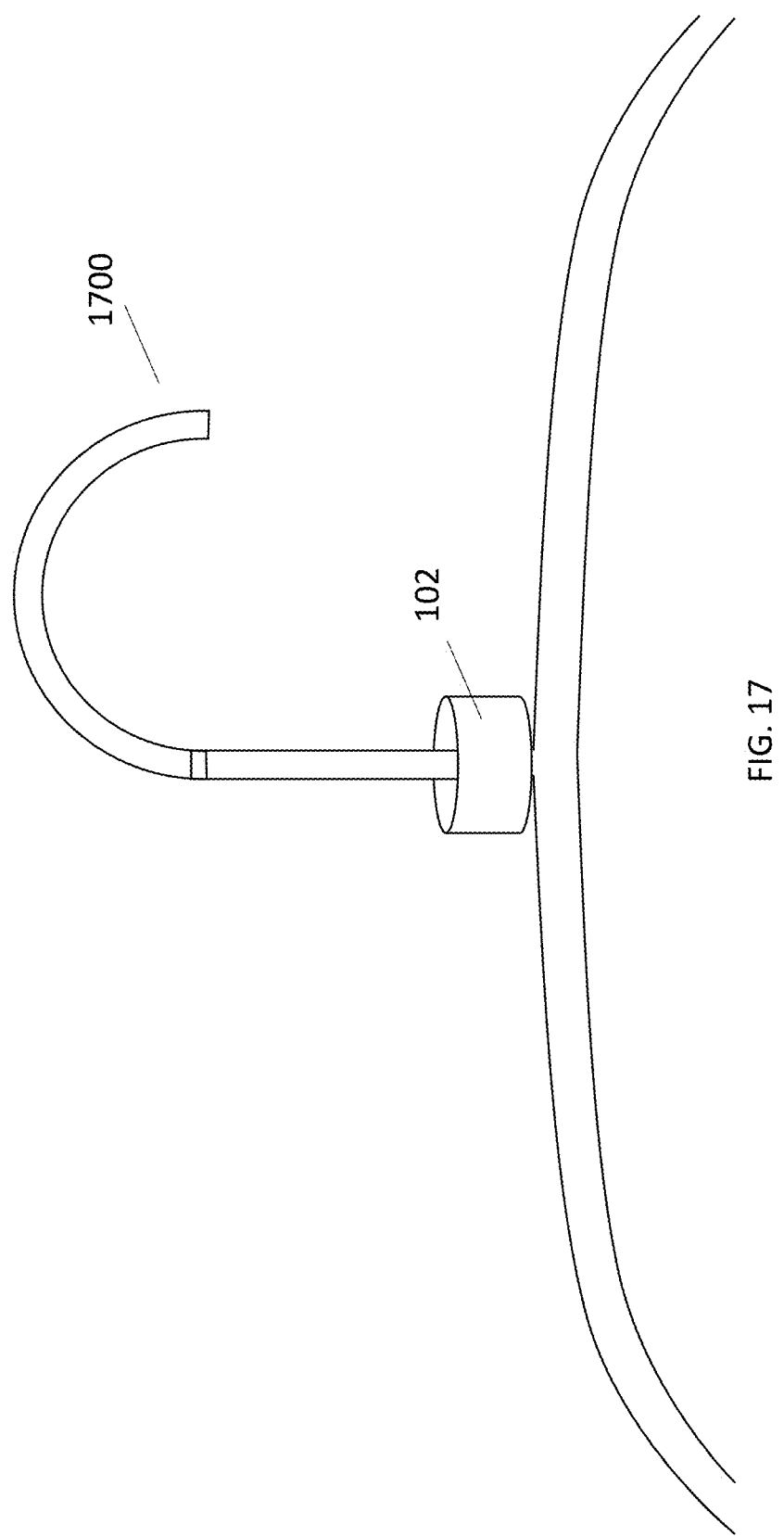
FIG. 17 is a diagram of a clothes hanger with an embodiment of an article-identification-and-location device disposed around the neck of the hanger.

FIG. 17 shows an embodiment of the article-identification-and-location device 102 adapted to slide over the hook and down the neck of a clothes hanger 1700, where the article-identification-and-location device 102 sits on the hanger's shoulder. The article-identification-and-location device 102 houses the various components of the article-identification-and-location device 102 described in FIG. 5, including the RF receiver (or transceiver), the processor, the memory, the power source, the indicator(s), and, optionally, the one or more sensors. At least a portion of the exterior or outward facing portion of the body of the article-identification-and-location device 102 is translucent to allow an internal LED to illuminate the article-identification-and-location device 102 to produce notifications as described herein.

Figure 18:
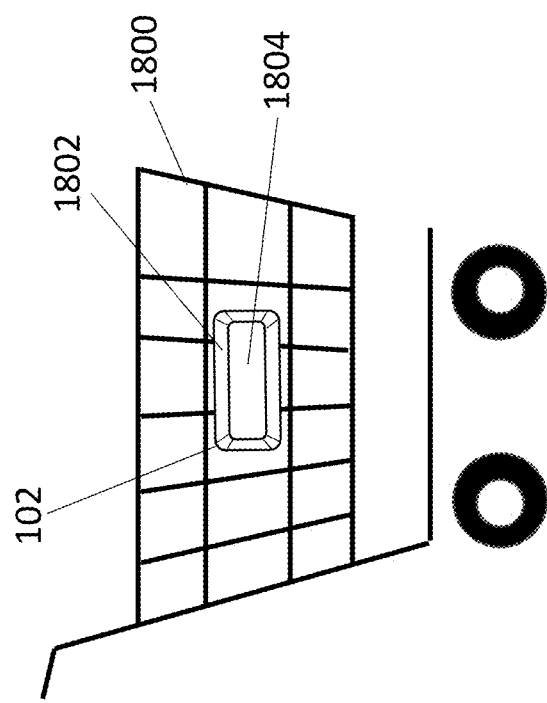
FIG. 18 is a diagram of a shopping cart with an embodiment of an article-identification-and-location device coupled to one side of the cart.

FIG. 18 shows another embodiment of an article-identification-and-location device 102 coupled to a side of a shopping cart 1800. This embodiment has a rectangularly shaped body or frame and houses the RF receiver (or transceiver), the processor, the memory, the power source, the indicator(s), and, optionally, the one or more sensors described in connection with FIG. 5. On one side of the frame 1802 is a translucent window 1804 that faces away (or outward) from the cart, to allow an internal LED to illuminate the article-identification-and-location device 102 that alerts a customer attempting to locate it. The opposite side of the frame 1802 is adapted to affix or adhere to the shopping cart.

Figure 19:
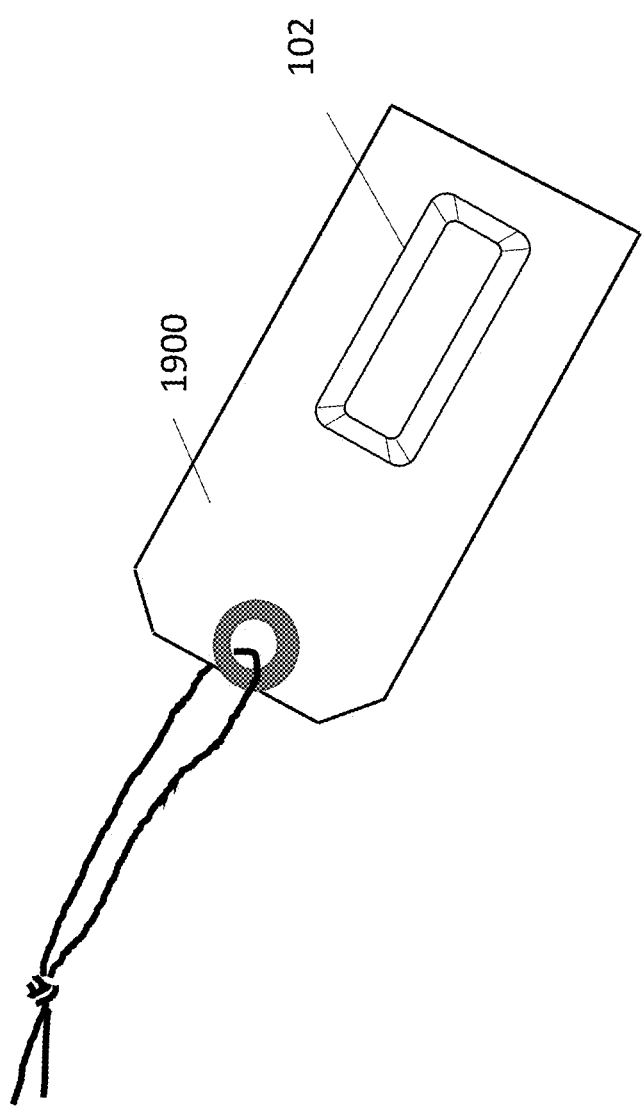
FIG. 19 is a diagram of a label with an embodiment of an article-identification-and-location device coupled to one side of the label.
Figure 20:
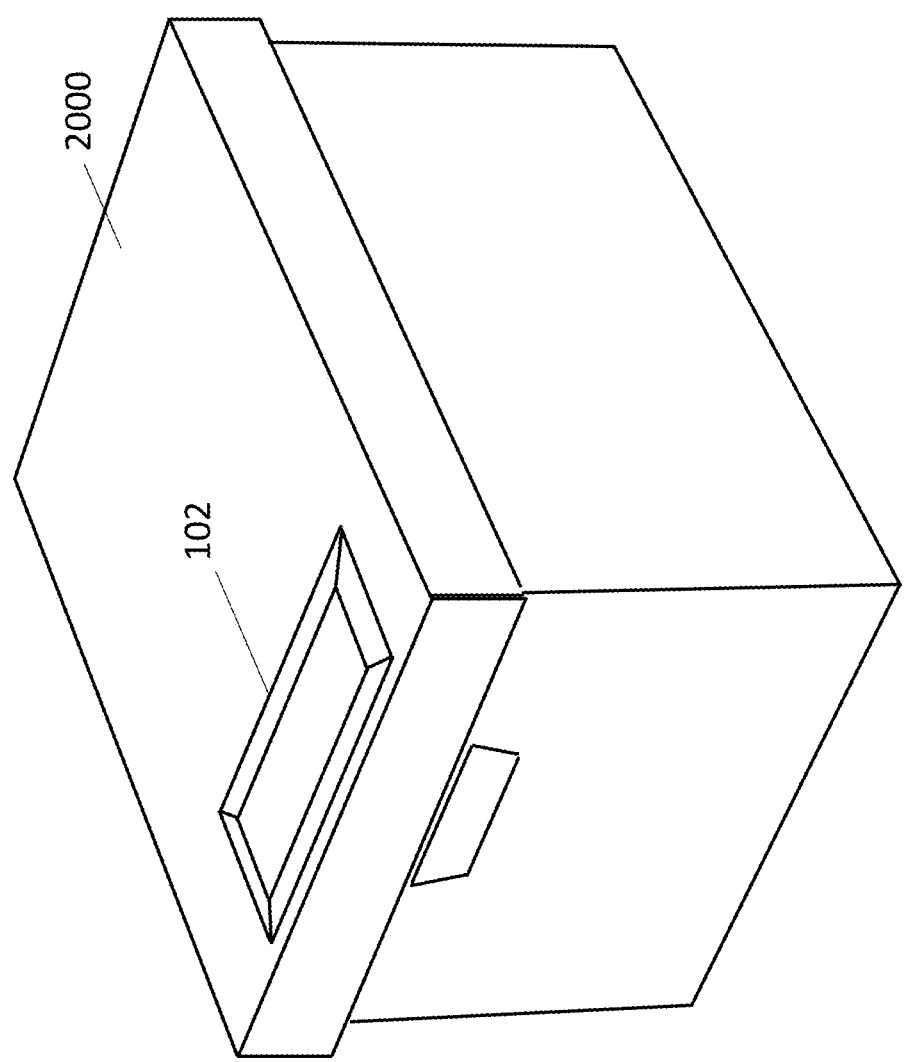
FIG. 20 is a diagram of a box with an embodiment of an article-identification-and-location device coupled to a lid of the box.
Figure 21:
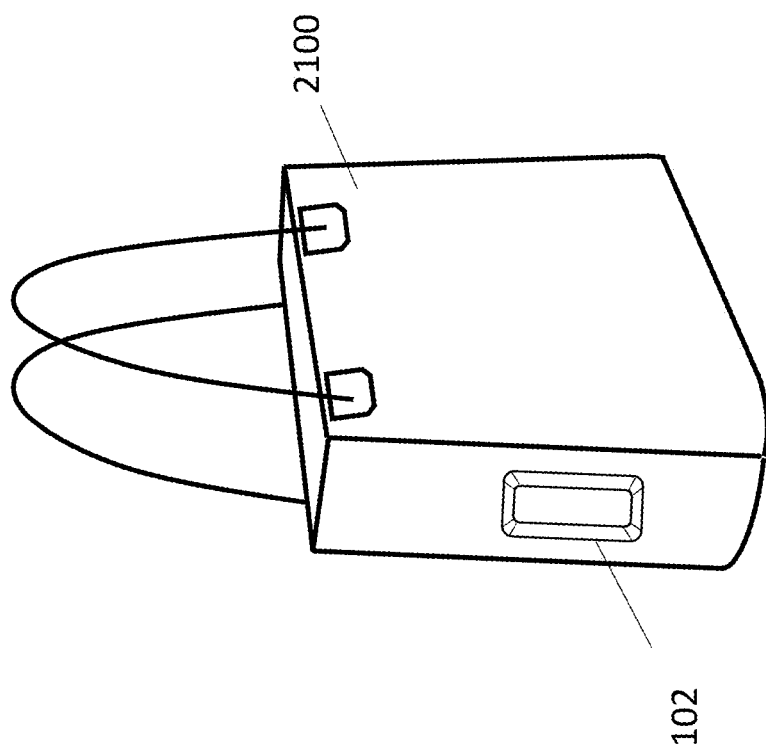
FIG. 21 is a diagram of a bag with an embodiment of an article-identification-and-location device coupled to one side of the bag.

FIG. 19 shows the article-identification-and-location device 102 of FIG. 18 affixed or adhered to one side of a label 1900; FIG. 20 shows the article-identification-and-location device 102 of FIG. 18 affixed or adhered to the top of a box 2000; and FIG. 21 shows the article-identification-and-location device 102 of FIG. 18 affixed, adhered, or integrated into a side of a bag 2100.

The locations of the article-identification-and-location device 102 in FIG. 18, FIG. 19. FIG. 20, and FIG. 21 are for illustration purposes; the article-identification-and-location device 102 can be located at other suitable places on the cart 1800, label 1900, box 2000, and bag 2100 without departing from the principles described herein, such suitable places being where the notifications produced by the article-identification-and-location device 102 are readily visible or audible.

Figure 22:
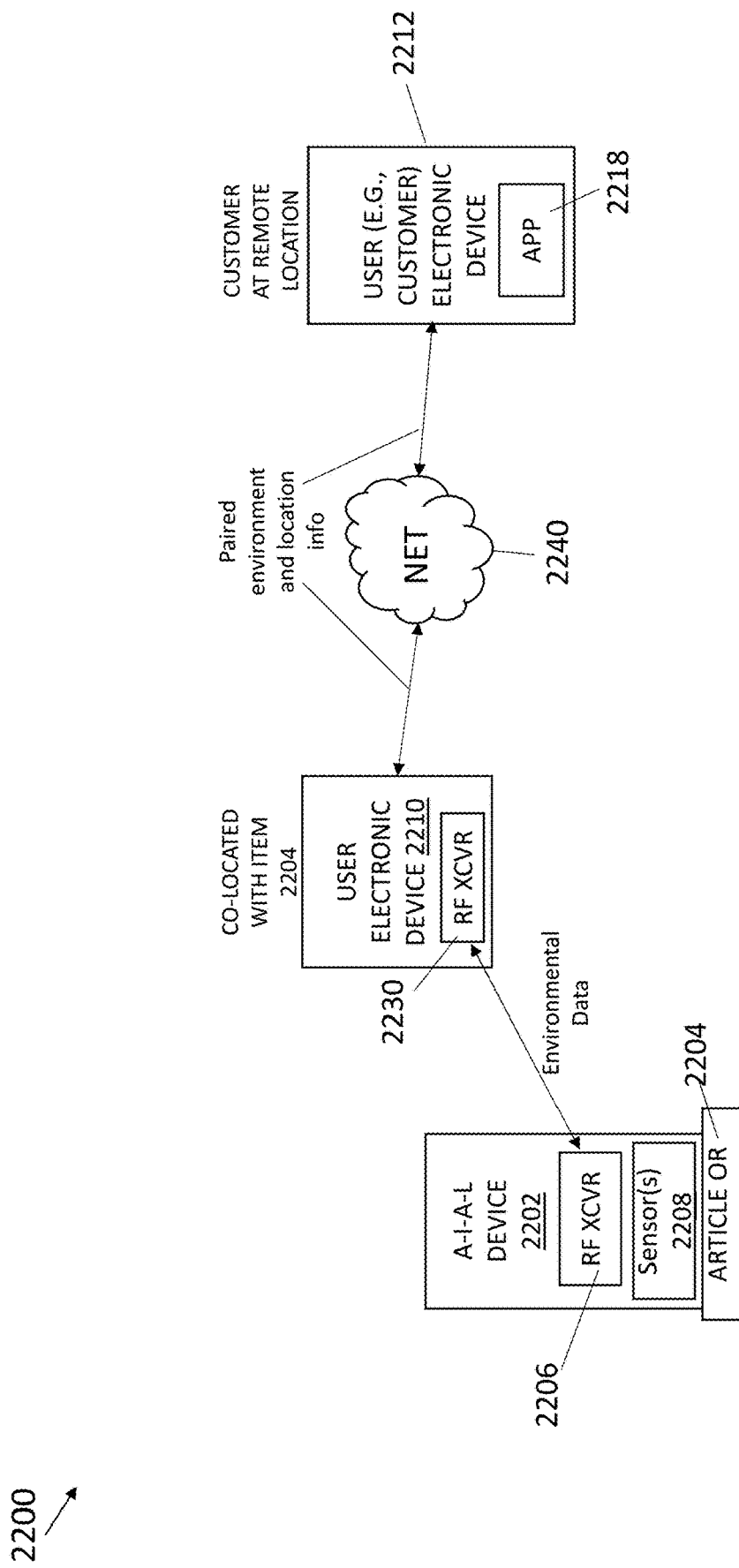
FIG. 22 is a block diagram of an embodiment of a system for providing information to a customer regarding the delivery of an item, including flow arrows illustrating data exchanges between components of the system.

FIG. 22 shows of an embodiment of a system 2200 having an article-identification-and-location (A-I-A-L) device 2202 that is physically coupled to an article or item of interest 2204 and is used to monitor the environmental conditions to which that item of interest 2204 is exposed. The system 2200 also includes a user electronic device 2210 (e.g., a smartphone, on-board navigation system for a vehicle or craft) and a customer electronic device 2212 (e.g., a smartphone, laptop computer).

The article-identification-and-location device 2202 includes an RF transceiver 2206 and one or more sensors 2208. The article-identification device 2302, RF transceiver 2206, one or more sensors 2208 can be similar to or the same as the described embodiments of the article-identificationand-location device 102, RF transceiver 116, and one or more sensors 508 previously described in FIGS. 1-21, and therefore repetitive details thereof are omitted for brevity's sake. The RF transceiver 2206 of the article-identification-and-location device 2202 is in radio communication with an RF transceiver 2230 of the user electronic device 2210. The user electronic device 2210 is in communication with the customer electronic device 2212 over a network 2240 (e.g., the Internet).

Figure 23:
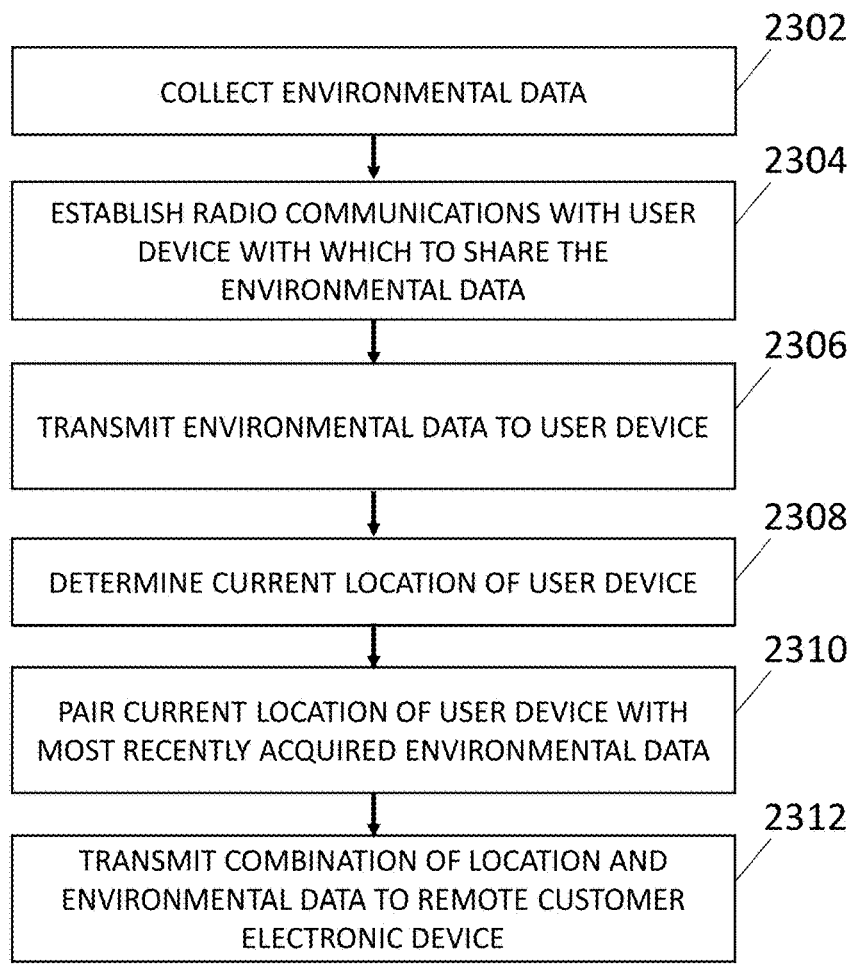
FIG. 23 is a flowchart of an embodiment of a process by which the article-identification-and-location device provides environmental data to an authorized user electronic device.

FIG. 23 shows an embodiment of a process 2300 for generating environmental data in connection with an operation of an article-identification-and-location device 2202. The article-identification-and-location device 2202 is physically coupled to an item of interest 2204. As used herein, examples of being "physically coupled" include, but are not limited to, being connected to, placed on, placed near or adjacent, affixed to, attached to, and clipped to. Examples of the item of interest 2204 include, but are not limited to, boxes, bags, baggage, luggage, and labels. The description of process 2300 makes references to various elements of the system 100 shown and described in FIG. 1 and/or the system 2200 of FIG. 22.

At step 2302 of the process 2300, one or more sensors 2208 of the article-identification-and-location device 2202 collect environmental data, for example, temperature, humidity, and inertial information, such as motion, regarding the item of interest 2204, the article-identification-and-location device 2202, or both. The article-identification-and-location device 2202 establishes (step 2304) radio communications with the user electronic device 2210. The establishing of these communications, in effect, authorizes the user of the electronic device 2210 to gather information from the article-identification-and-location device 2202.

In one embodiment, to establish these RF communications, the article-identification-and-location device 2202 receives a radiofrequency (RF) signal transmitted by the user electronic device 2210 and compares information acquired from the RF signal with a unique identifier stored in memory of the article-identification-and-location device 2202. This unique identifier is associated with the item of interest 2204 and with the user electronic device 2210 (and/or with the user of the device 2210). Upon determining a match between the information acquired from the RF signal transmitted by the user electronic device 2210 and the unique identifier stored in the memory of the article-identification-and-location device, the article-identification-and-location device can then transmit (step 2306) an RF signal that conveys measured environmental data to the user electronic device 2210. This transmission of the environmental data can occur in response to validation of the user electronic device 2210 (i.e., in response to determining the match) or in response to a specific command from the user electronic device 2210 to send the environmental data. The article-identification-and-location device can transmit measured environmental data to the user electronic device 2210 continuously or at specific intervals, automatically or in response to commands from the user electronic device 2210.

In some embodiments, the one or more sensors 2208 collect the environmental data before the RF communications are established with the user electronic device 2210 (and saves the data), in automatic response to the RF communications being established, or after the RF communications are established (e.g., in response to specific commands from the user electronic device 2210) to collect the environmental data). The one or more sensors 2208 of the article-identification-and-location device 2202 can collect real-time environmental data continuously or at specific intervals. Which environmental data to collect, for example, when the sensors 2208 are adapted to measure multiple types of conditions, such as temperature and humidity, but the user electronic device 2210 is interested in only one specific type, can be selected by the user electronic device 2210 or by a control setting within the article-identification-and-location device 2202. Alternatively, the sensors 2208 can measure every environmental condition for which the sensors are adapted, save the measured data, and the selection of which environmental data to send to the user electronic device 2210 is established by RF communications between the user electronic device 2210 and the article-identification-and-location device 2202.

In addition, the user electronic device 2210 determines (step 2308) its current geographical location. For purposes of determining its own geographical location, the electronic device 2210 can use a Global Positioning System (GPS), online mapping service, or other location service or application. The user electronic device 2210 may determine its current location before receiving from the device 2202 the RF signal that conveys the environmental data, in response to receiving that RF signal, or after receiving the RF signal. The user electronic device 2210 associates or pairs (step 2310) the current geographical location of the user electronic device 2210 with the environmental data most recently received from the article-identification-and-location device. The electronic device 2210 can then transmit (step 2312) this paired location information and environmental data to the customer electronic device 2212 over the network 2240. From this communication, the customer can learn what environmental condition(s) the item of interest 2204 was exposed to when the item of interest 2204 was located at the identified geographical location.

To illustrate the process 2300 by example, consider a delivery driver who is delivering pizza (i.e., an item of interest 2204) from an establishment such as a pizza parlor to a destination (e.g., a customer's house), and the customer wants to monitor the temperature of the pizza inside its box and the pizza's location during its transport to the customer's house. The article-identification-and-location device 2202 can be affixed to the box or other object that permits the one or more sensors 2208 of the article-identification-and-location device 2202 to collect data about the pizza's environment, for example, temperature, along the pizza delivery route. The temperature measured is considered to approximate the temperature of the pizza because the pizza and the article-identification-and-location device 2202 are preferably exposed to the same environmental conditions. The delivery driver's smartphone (i.e., user electronic device 2210) communicates with the article-identification-and-location device 2202, using an exchange of RF signals as previously described, to acquire the temperature data collected by the article-identification-and-location device 2202. In addition to acquiring the temperature data from the article-identification-and-location device 2202, the delivery driver's smartphone acquires geographical location data about its own present location. To acquire this geographical location data, the smartphone can have a GPS device, or the like, or use a remote online mapping service. This current geographical location data of the user electronic device 2210 is considered to approximate the current location of the pizza because the delivery driver and the pizza are preferably in the same place (i.e., in the delivery vehicle). The delivery driver's smartphone pairs (i.e., associates, links) the temperature data with the geographical location data, thus producing a data point, comprised of the pizza's temperature and paired location along the pizza delivery route. The delivery driver's smartphone can continuously or at specific intervals establish these data points for the entirety of the delivery route. The delivery driver's smartphone can store a record of the collected data points for a variety of purposes, for example, for auditing delivery performance.

The real-time collection of temperature and location data enables both the delivery driver and the customer to monitor the temperature and location of the pizza, in real-time, along the delivery route. The delivery driver simply views the screen of the user electronic device 2210 to ascertain the pizza's current temperature and location. For the customer to monitor, the delivery driver's electronic device 2210 can send the data points, as collected in real time, to the customer's electronic device 2212 over the network 2240.

Figure 24:
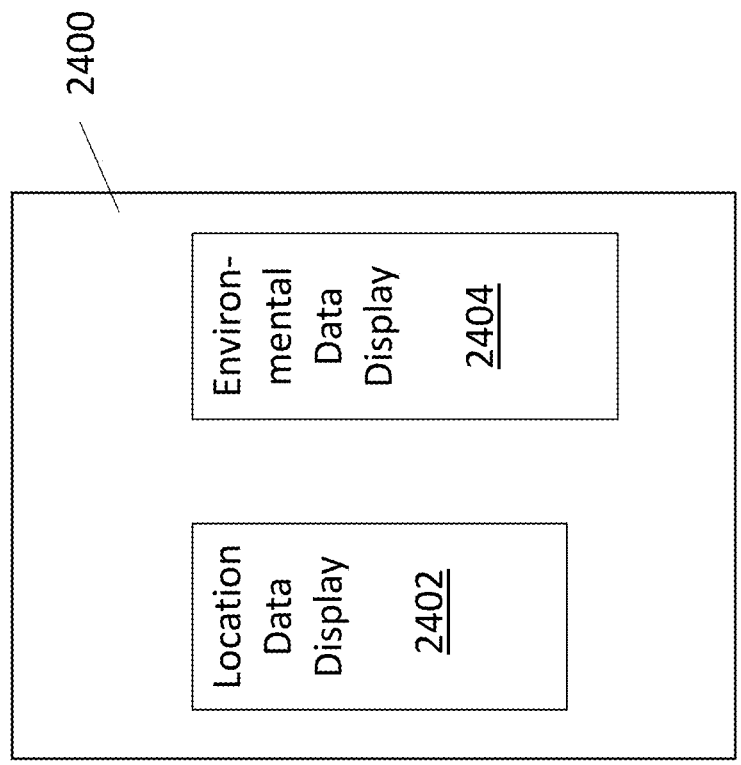
FIG. 24 is a diagram of an embodiment of a graphical user interface (GUI) that displays information generated by an article-identification-and-location device of FIGS. 1-23.

FIG. 24 illustrates a graphical user interface (GUI) 2400 displayed on the customer mobile device 2212 when running a computer-executed application ("app") that communicates with the user electronic device 2210 to acquire environmental and location data. The app produces a first icon 2402 or other text, graphical display, audio or the like that provides the location data of the process 2300 and a second icon 2404 or other text, graphical display, audio or the like that provides the environmental data of the process 2300. In some embodiments, the icons 2402, 2404 or other text, graphical display, audio or the like can be displayed by the application described above running on the customer electronic device 2212; by way of example, one representing the delivery driver's current location, and the other representing the environmental data such as pizza temperature sensed by the article-identification-and-location device 2202.

Figure 25:
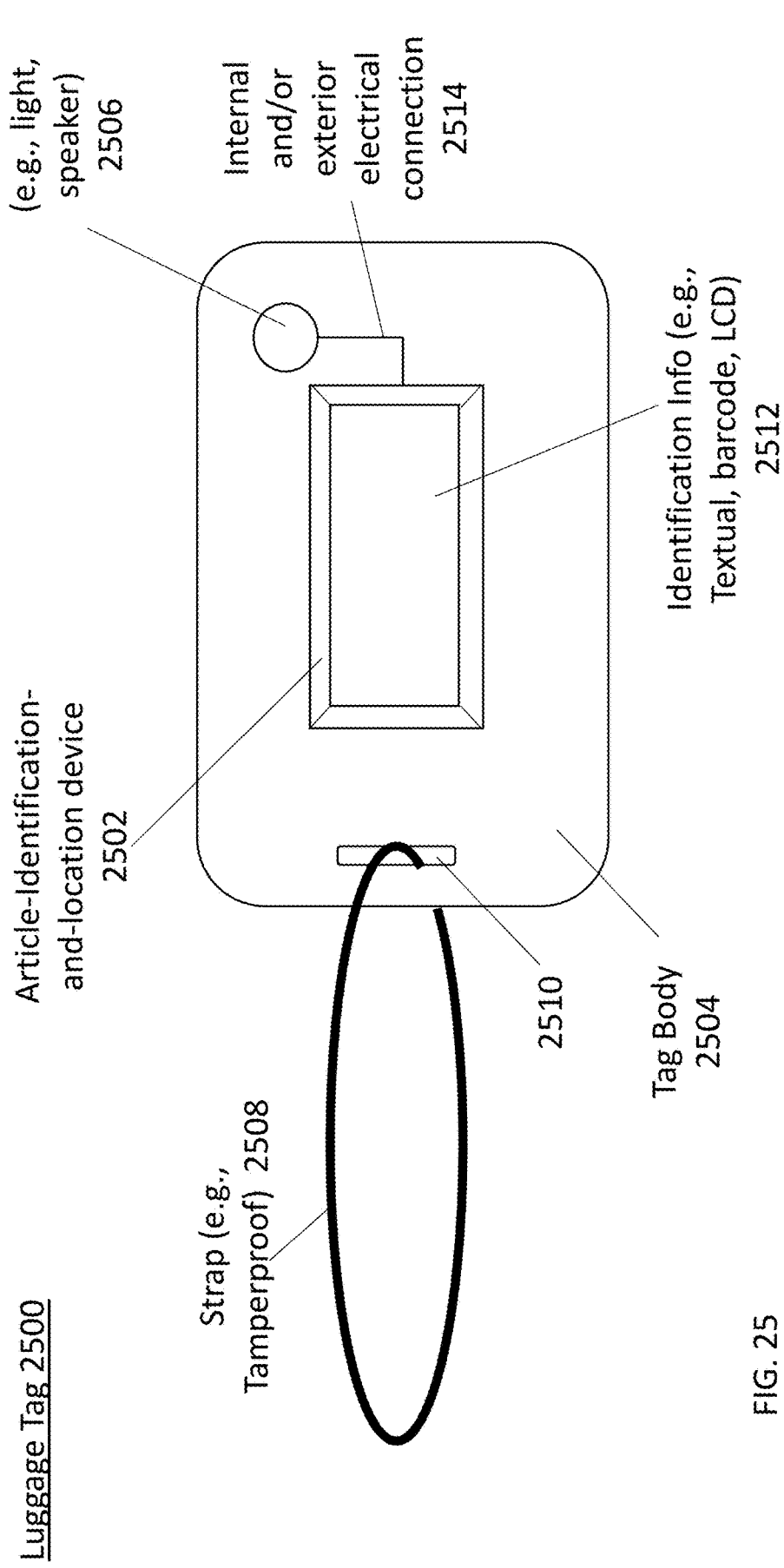
FIG. 25 is a diagram of an article-identification-and-location device of FIGS. 1-23 embodied as a luggage (or baggage) tag.

FIG. 25 shows an embodiment of a luggage tag 2500 incorporating the principles of described herein. The luggage tag 2500 includes an article-identification-and-location device 2502 disposed on or within thin tag body 2504 having a thickness ranging from 2 mm-10 cm, and preferably about 15 mm, but not limited thereto. For example, other thickness greater than 10 cm or less than 2 mm may equally apply. The article-identification-and-location device 2502 is in communication with an indicator 2506 over an electrical communication path 2514, which may be within or on (or both) the tag body. Embodiments of the article-identification-and-location device 2502 and of the indicator are constructed and operate as previously described herein. In general, the article-identification-and-location device includes the electronics that pairs with a customer (e.g., BLE (Bluetooth Low Energy) sensor in communication with the luggage owner via an application program or similar smartphone) and uses the indicator 2506 to alert the customer to the location of the luggage. Although shown on one side of the tag body, the indicator can appear at any location of the tag body, including the tag body's edge(s). The tag body 2504 can be constructed of plastic, leather, canvas, denim, vinyl, silicone, neoprene, or any other sturdy and durable material; the body can be transparent, opaque, or both.

A strap 2508 is coupled to the tag body 2504. In the embodiment shown, the strap passes through a small opening 2510 in the tag body. The strap is used to attach or couple the luggage tag 2500 to a piece of luggage (as an example), the strap being sized to pass around a handle of the luggage or through the eye of a zipper. Preferably, the strap is tamperproof. Example implementations of tamperproof straps include an uncuttable (e.g., braided steel) leash, cable, tie, belt, or strip and straps with tamper sensors (e.g., contact sensor). Other means for connecting, attaching, or coupling the tag body to a piece of luggage can be used without departing from the principles of the invention described herein, examples of which include clips or clamps disposed on an edge or on a rear side of the tag body. Some such means can be irremovable from the luggage piece (e.g., sewn onto or into the luggage); other such means can be designed to be removable. Some embodiments of the means for connecting, attaching, or coupling the tag body to a piece of luggage may not need the small opening 2510 in the tag body; in such embodiments the small opening 2510 can be dispensed with.

On an exterior-side of the tag body is an information holder 2512. Embodiments of the information holder include any means by which information (e.g., name, address, contact information) about the traveler and/or baggage owner can be acquired from the luggage tag. For example, the display means can be a piece of paper with textual information, a device-readable barcode, or an LCD.

As will be appreciated by one skilled in the art, aspects of the present invention may be embodied as a system, method, and apparatus. Thus, some aspects of the present invention may be embodied entirely in hardware, entirely in software (including, but not limited to, firmware, program code, resident software, microcode), or in a combination of hardware and software.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. References to "one embodiment" or "an embodiment" or "another embodiment" means that a feature, structure, or characteristic described in connection with the embodiment is included in at least one embodiment described herein. References to one embodiment within the specification do not necessarily all refer to the same embodiment. The features illustrated or described in connection with one exemplary embodiment may be combined with the features of other embodiments.

Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all the described terms. Any references to front and back, left and right, top and bottom, upper and lower, inner and outer, interior and exterior, and vertical and horizontal are intended for convenience of description, not to limit the described systems and methods or their components to any one positional or spatial orientation. Accordingly, the foregoing description and drawings are by way of example only, and the scope of the invention should be determined from proper construction of the appended claims, and their equivalents.

What is claimed is:

1. An electronic tag comprising:
   an indicator; and
   a body including:

a radiofrequency (RF) receiver configured to receive an RF signal transmitted by an RF transmitter; and a processor in communication with the RF receiver and the indicator, the processor being configured to acquire unique information from the RF signal that is received by the RF receiver, to process the unique information to switch to a mode from a plurality of different modes that the tag operates in and to perform an action commensurate with the mode from a plurality of preset actions in response to comparing the acquired unique information with a unique identifier stored in the electronic tag, wherein in the mode, the electronic tag awakens from a sleep mode to listen for the acquired unique information, the action including controlling the indicator, the tag further comprising:

means for coupling the body of the electronic tag to an object.

2. The electronic tag of claim 1, wherein the unique identifier distinguishes the electronic tag from one or more other electronic tags.

3. The electronic tag of claim 2, wherein the unique information further includes at least one of product information, customer information, or a customer identification, and wherein the unique identifier is used to associate the electronic tag with at least one of the object and a customer of the object using the at least one of the product information, customer information, or customer identification.

4. The electronic tag of claim 3, further comprising a memory, wherein the unique identifier is stored in the memory of the electronic tag in communication with the processor, and wherein the unique identifier is compared to a unique identifier received by an electronic device of the customer to activate the indicator of the electronic tag.

5. The electronic tag of claim 4, wherein the processor is further configured to compare the information acquired from the RF signals with the unique identifier stored in the memory and to turn on the indicator if the information acquired from the RF signals matches the unique identifier stored in the memory.

6. The electronic tag of claim 1, further including at least one sensor and an article-identification-and-location device comprising electronics that pairs with the at least one sensor to detect a change of state of the electronic tag and activate the indicator in response to the change of state.

7. The electronic tag of claim 6, wherein the change of state detected by the at least one sensor is correlated with the unique information to validate the coupling to determine whether the action is correct.

8. The electronic tag of claim 6, wherein a state includes an indicate state, an active state, an incorrect state, a coupled state, and an alarm state, and the electronic tag switches between the two or more of the indicate state, the active state, the incorrect state, the coupled state, and the alarm state.

9. The electronic tag of claim 1, wherein the unique information includes at least one command.

10. A tracking system, comprising:

a plurality of electronic tags, each electronic tag comprising:
  an indicator;
  a body including:
    a radiofrequency (RF) receiver configured to receive an RF signal transmitted by an RF transmitter; and
    a processor in communication with the RF receiver and the indicator, the processor being configured to acquire unique information from the RF signal that is received by the RF receiver, to process the unique information to switch to a mode from a plurality of different modes that the tag operates in, and to perform an action commensurate with the mode from a plurality of preset actions in response to comparing the acquired unique information with a unique identifier stored in the electronic tag, wherein in the mode, the electronic tag awakens from a sleep mode to listen for the acquired unique information, the action including controlling the indicator, each electronic tag further comprising:

means for coupling the body of the electronic tag to an object, wherein:
    the unique identifier that distinguishes the each electronic tag from other electronic tags of the plurality of electronic tags from one or more other electronic tags, and
    wherein the tracking system further comprises:
    a computing system that manages associations between the plurality of electronic tags and items of interest.

11. The tracking system of claim 10, wherein at least one electronic tag of the plurality of electronic tags includes an RF transmitter that transmits RF signals received by multiple RF transceivers, the multiple RF receivers using signal strength or angle of arrival measurements of the received RF signals to navigate a mobile device to the at least one electronic tag.

12. The tracking system of claim 10, wherein the computing system determines a change in state of the electronic tag with respect to the item of interest.

13. The tracking system of claim 12, wherein the change in state includes a change between an indicate state, an active state, an incorrect state, a coupled state, and an alarm state.

14. The tracking system of claim 10, wherein the unique information further includes at least one of product information, customer information, or a customer identification, and wherein the unique identifier is associated with at least one of the object and a customer of the object using the at least one of the product information, customer information, or customer identification.

15. The tracking system of claim 14, further comprising a memory, wherein the unique identifier is stored in the memory of the electronic tag in communication with the processor, and wherein the unique identifier is compared to a unique identifier received by an electronic device of the customer to activate the indicator of the electronic tag.

16. An electronic tag comprising:
  an indicator;
  a body including:
    a radiofrequency (RF) receiver configured to receive an RF signal transmitted by an RF transmitter; and
    a processor in communication with the RF receiver and the indicator, the processor being configured to use a set of unique information including at least one command and a unique identifier to associate the electronic tag with at least one of an object and a customer of the object, to process the unique information to switch to a mode from a plurality of different modes that the tag operates in, and to perform an action commensurate with the mode from a plurality of preset actions in response to comparing the acquired unique information with a unique identifier stored in the electronic tag, wherein in the mode, the electronic tag awakens from a sleep mode to listen for the acquired unique information, the action including controlling the indicator.

* * * * *